(12) United States Patent
Nakajima

(10) Patent No.: US 7,916,374 B2
(45) Date of Patent: Mar. 29, 2011

(54) OPTICAL SCANNING DEVICE, OPTICAL SCANNING METHOD, PROGRAM, RECORDING MEDIUM, AND IMAGE FORMING APPARATUS

(75) Inventor: Tomohiro Nakajima, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 455 days.

(21) Appl. No.: 12/040,010

(22) Filed: Feb. 29, 2008

(65) Prior Publication Data

US 2008/0212156 A1 Sep. 4, 2008

(30) Foreign Application Priority Data

Mar. 2, 2007 (JP) ................................ 2007-052155

(51) Int. Cl.
G02B 26/08 (2006.01)

(52) U.S. Cl. ................................................. 359/204.1
(58) Field of Classification Search ............... 359/204.1; 347/233
See application file for complete search history.

(56) References Cited

U.S. PATENT DOCUMENTS

| | | |
|---|---|---|
| 4,853,710 A | 8/1989 | Shimada et al. |
| 5,633,744 A | 5/1997 | Nakajima |
| 5,671,077 A | 9/1997 | Imakawa et al. |
| 5,753,907 A | 5/1998 | Nakajima et al. |
| 5,786,594 A | 7/1998 | Ito et al. |
| 5,793,408 A | 8/1998 | Nakajima |
| 5,936,756 A | 8/1999 | Nakajima |
| 5,999,345 A | 12/1999 | Nakajima et al. |
| 6,052,211 A | 4/2000 | Nakajima |
| 6,091,534 A | 7/2000 | Nakajima |
| 6,621,512 B2 | 9/2003 | Nakajima et al. |
| 6,657,765 B2 | 12/2003 | Hayashi et al. |
| 6,775,041 B1 | 8/2004 | Nakajima |
| 6,839,157 B2 | 1/2005 | Ono et al. |
| 6,932,271 B2 | 8/2005 | Nakajima et al. |
| 6,972,883 B2 | 12/2005 | Fujii et al. |
| 6,995,885 B2 | 2/2006 | Nakajima |
| 7,068,296 B2 | 6/2006 | Hayashi et al. |
| 7,075,688 B2 | 7/2006 | Nakajima |
| 7,170,660 B2 | 1/2007 | Nakajima |
| 7,221,493 B2 | 5/2007 | Fujii et al. |
| 2002/0122217 A1 | 9/2002 | Nakajima |
| 2003/0053156 A1 | 3/2003 | Satoh et al. |
| 2004/0032631 A1 | 2/2004 | Amada et al. |
| 2004/0036936 A1 | 2/2004 | Nakajima et al. |
| 2005/0062836 A1 | 3/2005 | Nakajima |
| 2005/0105156 A1 | 5/2005 | Ono et al. |
| 2005/0185237 A1 | 8/2005 | Nakajima |

(Continued)

FOREIGN PATENT DOCUMENTS

JP 2002-341273 11/2002

(Continued)

*Primary Examiner* — Euncha P Cherry
(74) *Attorney, Agent, or Firm* — Dickstein Shapiro LLP

(57) ABSTRACT

An optical scanning device is configured to identify a light-emitting unit at the start of writing on the basis of a sub-scanning resist displacement and selects a combination of four light-emitting units according to the light-emitting unit at the start of writing. The optical scanning device predicts the amount of deformation of pixel according to the combination and adjusts a light volume of light emission from a light-emitting unit to be corrected using the amount of deformation. Thereby, a pixel with an excellent shape quality can be constantly formed regardless of the combination of the light-emitting units and a pixel formed of multiple dots can be accurately and stably formed.

19 Claims, 21 Drawing Sheets

U.S. PATENT DOCUMENTS

| | | |
|---|---|---|
| 2005/0190420 A1 | 9/2005 | Imai et al. |
| 2005/0243396 A1 | 11/2005 | Fujii et al. |
| 2006/0012844 A1 | 1/2006 | Fujii et al. |
| 2006/0028533 A1 | 2/2006 | Nakajima |
| 2006/0132880 A1 | 6/2006 | Amada et al. |
| 2006/0158711 A1 | 7/2006 | Imai et al. |
| 2006/0232660 A1 | 10/2006 | Nakajima et al. |
| 2006/0232844 A1 | 10/2006 | Nakajima |
| 2006/0245009 A1 | 11/2006 | Akiyama et al. |
| 2006/0285186 A1* | 12/2006 | Ishida et al. .................. 359/204 |
| 2007/0035796 A1 | 2/2007 | Nakajima |
| 2007/0058232 A1 | 3/2007 | Nakajima |
| 2007/0058255 A1 | 3/2007 | Imai et al. |
| 2007/0146738 A1 | 6/2007 | Nakajima |
| 2007/0146851 A1 | 6/2007 | Nakajima |
| 2007/0146856 A1 | 6/2007 | Nakajima |
| 2007/0206259 A1 | 9/2007 | Nakajima |
| 2008/0024590 A1 | 1/2008 | Nakajima |

FOREIGN PATENT DOCUMENTS

| | | |
|---|---|---|
| JP | 2003-211728 | 7/2003 |
| JP | 2004-106365 | 4/2004 |
| JP | 3644923 | 2/2005 |

* cited by examiner $d0 = d \cdot \sin \gamma = p/\beta s$
$d1 = 8 \times p/\beta s$

INCIDENT BEAM

Z

REFRACTION INDEX DISTRIBUTION

ELECTRIC POTENTIAL DISTRIBUTION

ORIENTATION STATE OF LIQUID CRYSTAL MOLECULES

MAIN SCANNING DIRECTION

D1≠D0
D2≠D0

FIG. 23A
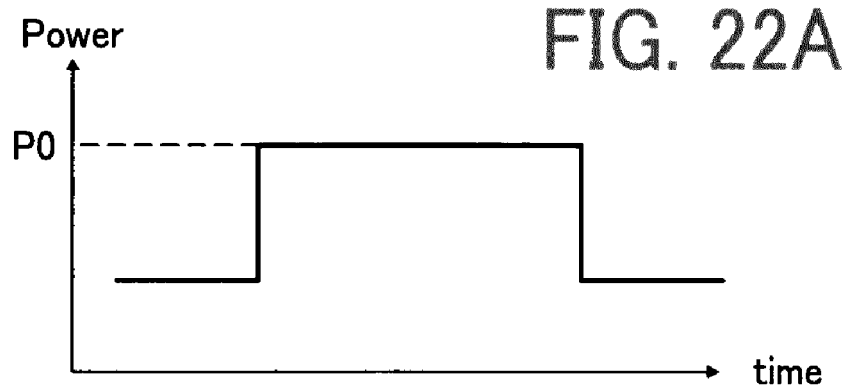
FIG. 22A
FIG. 23B
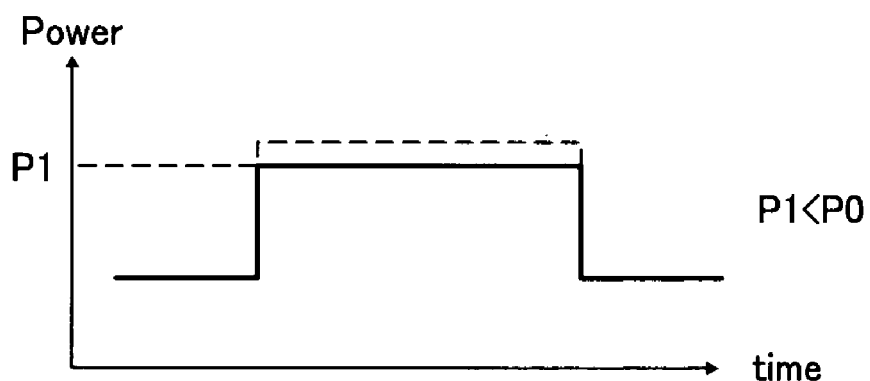
P1<P0
FIG. 23C
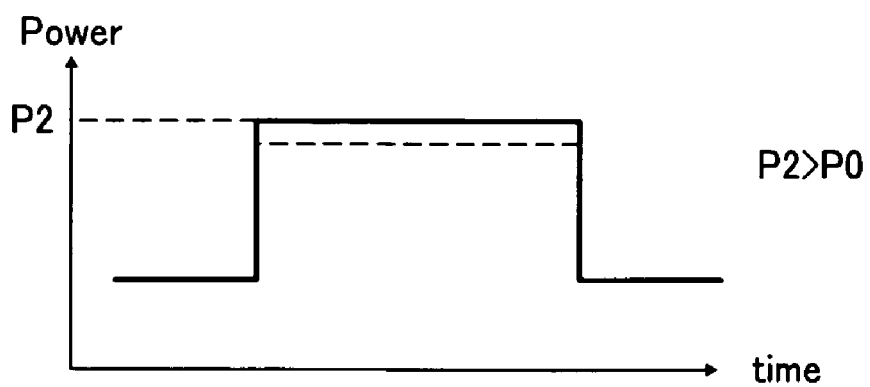
P2>P0

OPTICAL SCANNING DEVICE, OPTICAL SCANNING METHOD, PROGRAM, RECORDING MEDIUM, AND IMAGE FORMING APPARATUS

PRIORITY CLAIM

The present application is based on and claims priority from Japanese Application Number 2007-052155, filed on Mar. 2, 2007, the disclosure of which is hereby incorporated by reference herein in its entirety.

BACKGROUND OF THE INVENTION

1. Field of the Invention

The present invention relates to an optical scanning device, an optical scanning method, a program, a recording medium, and an image forming apparatus. More specifically, the present invention relates to an optical scanning device, which scans a surface to be scanned with multiple light beams, an optical scanning method, a program used in the optical scanning device, a recording medium in which the program is recorded, and an image forming apparatus including the optical scanning device.

2. Description of Related Art

Image forming apparatuses using laser are widely mod in recording electrophotographic images. Each of the image forming apparatuses generally includes an optical scanning device and forms a latent image by rotating a photosensitive drum while scanning the drum with laser beam in the axis direction of the drum by using a polygon scanner (for example, a polygon mirror). In the field of electrophotography, the image forming apparatus requires high-image-density for improving an image quality, high operability and high speed to output an image for achieving an improvement in the processing speed.

For example, Japanese Patent Application Publication No. 2002-341273 discloses an optical scanning device in which multiple light beams are divided by optical deflection means using a rotating reflection surface, one portion of the divided beams scans an image carrier from a predetermined direction, and the other portion of the beams scans the image carrier from a direction opposite to the above-described direction. In the optical scanning device, the one portion and the other portion of the light beams all enter the rotating reflection surface of the optical deflector from a direction in which an entering angle to the rotating reflection surface of the optical deflector becomes larger with its rotation.

In addition, a method for scanning multiple lines with multiple light beams is disclosed (see, for example, Japanese Patent Application Publications No. 2003-211728 and No. 2004-100365).

Japanese Patent Application Publication No. 2003-211728 discloses an image forming apparatus including N optical scanning devices (N is a natural number equal to or larger than 2) and same-shaped housings. The N optical scanning devices form M scanning lines (M is larger than N(N<M) and is a natural number equal to or larger than 3) on a surface to be scanned. The M scanning lines include at least one scanning line which is not on the same plane. The same-shaped housings house the respective optical scanning devices. At least one of the optical scanning devices includes an optical system different from those included in the other optical scanning devices.

Japanese Patent Application Publication No. 2004-106365 discloses an image forming apparatus including a photoreceptor, a charging device, a multi-beam scanning device, a developing device and a transfer device. The charging device charges a surface of the photoreceptor. The multi-beam scanning device optically scans a surface to be scanned with multiple light beams generated by deflecting each of the light beams emitted respectively from multiple light sources, while the surface of the photoreceptor charged by the charging device is utilized as the surface to be scanned. The developing device supplies toner onto the surface of the photoreceptor which is optically scanned by the multi-beam scanning device. The transfer device transfers the toner supplied onto the surface of the photoreceptor by the developing device to a transfer body to be transferred. In the image forming apparatus, the superimposed length of the scanning lines formed on the surface to be scanned by the simultaneous optical scanning performed by the multi-beam scanning device is set to be equal to or less than a minimum pixel.

However, in the conventional image forming apparatuses as described above, a pixel formed of multiple dots cannot be accurately and stably formed. Thus, a high quality image cannot be formed at high speed. Furthermore, a high definition image quality has been recently demanded because image forming apparatuses have been also used for simple printing as on-demand printing systems.

SUMMARY OF THE INVENTION

A first object of the present invention is to provide an optical scanning device in which a pixel formed of multiple dots can be accurately and stably formed and a high resolution image quality can be formed.

A second object of the present invention is to provide an optical scanning method with which a pixel formed of multiple dots can be accurately and stably formed.

A third object of the present invention is to provide a program which is executed by a control computer of the optical scanning device and allows a pixel formed of multiple dots to be accurately and stably formed and a recording medium in which the program is recorded.

A fourth object of the present invention is to provide an image forming apparatus in which a quality image can be formed at higher speed.

To achieve the above-described objects, an optical scanning device according to one embodiment of the present invention includes at least one light source in which a plurality of light-emitting units are two-dimensionally arranged, a deflector for deflecting multiple light beams from the at least one light source, an optical system for condensing the multiple light beams deflected by the deflector onto a surface to be scanned, and an adjustment device for adjusting a total light volume of light emission from a group of the light-emitting units on the basis of a positional relationship between the light-emitting units in the group of the light-emitting units formed of at least two light-emitting units which are selected from the group of the light-emitting units, and which form one pixel.

BRIEF DESCRIPTION OF THE DRAWINGS

FIGS. 23A to 23C are views, each of which illustrates adjustment of light-emitting power.

DETAILED DESCRIPTION OF THE PREFERRED EMBODIMENTS

Preferred embodiments of the present invention will be described below in detail by referring to the accompanying drawings.

Figure 1:
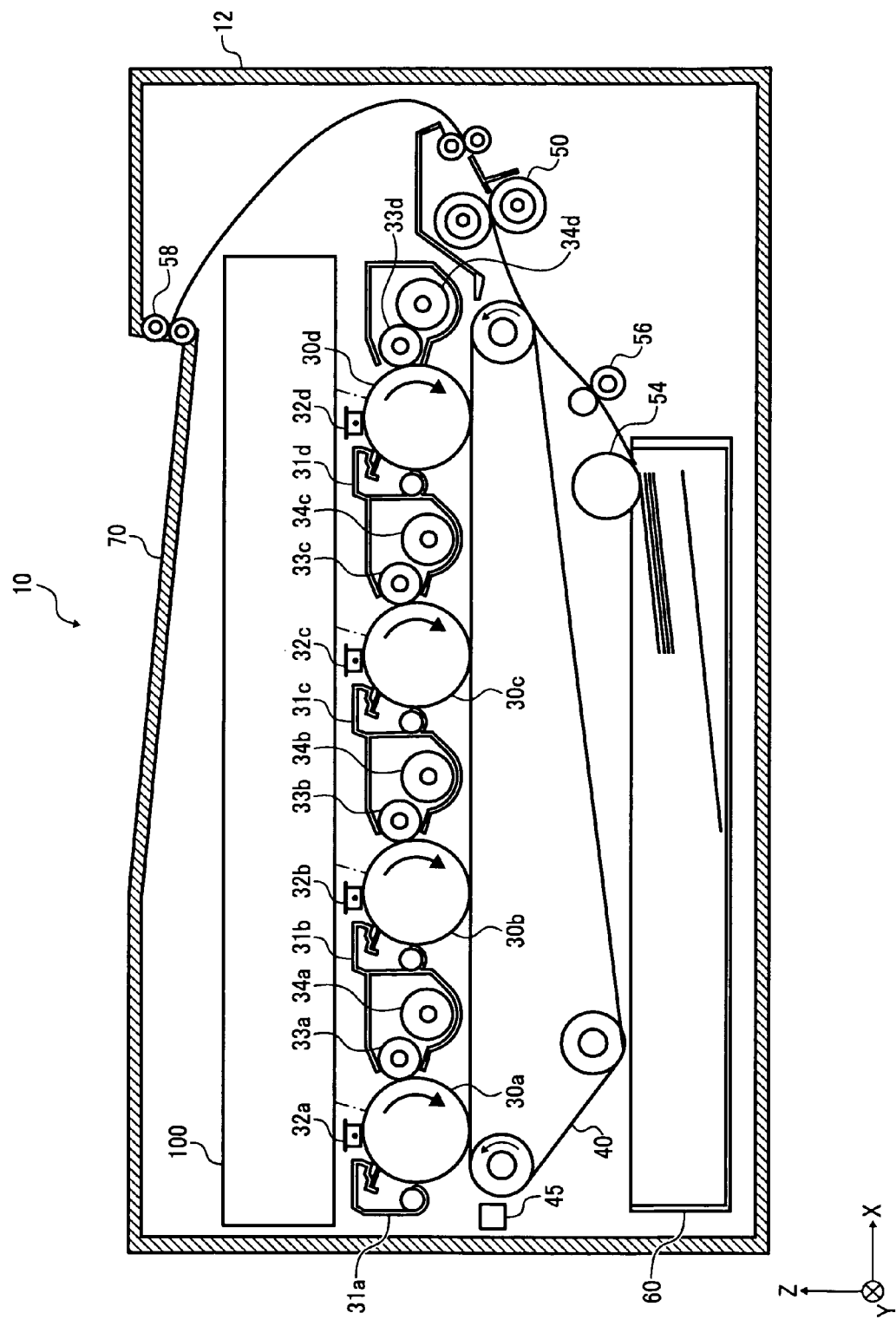
FIG. 1 is a schematic view showing the configuration of a printer according to one embodiment of the present invention.

FIG. 1 shows the schematic configuration of a printer 10 according to one embodiment of the present invention. The printer 10 is a multicolor tandem printer in which a full-color image is formed by superimposing four colors (black, cyan, magenta, and yellow). The printer 10 includes an optical scanning device 100, four photosensitive drums 30a to 30d, four chargers 32a to 32d, four developing rollers 33a to 33d, four toner cartridges 34a to 34d, four cleaning cases 31a to 31d, a transfer belt 40, a paper feed tray 60, a paper feed roller 54, a resist roller pair 56, a fixing roller 50, a paper discharge tray 70, a paper discharging roller 58, a displacement detector 45, an unillustrated printer control device, which integrally controls the above-described units, and a substantially rectangular parallelepiped housing 12 in which the above-described components are accommodated.

The photosensitive drum 30a, the charger 32a, the developing roller 33a, the toner cartridge 34a, and the cleaning case 31a are used as a set, and configure an image forming station for forming a black image (hereinafter referred to as "K station", for convenience).

The photosensitive drum 30b, the charger 32b, the developing roller 33b, the toner cartridge 34b, and the cleaning case 31b are used as a set, and configure an image forming station for forming a cyan image (hereinafter referred to as "C station", for convenience).

The photosensitive drum 30c, the charger 32c, the developing roller 33c, the toner cartridge 34c, and the cleaning case 31c are used as a set, and configure an image forming station for forming a magenta image (hereinafter referred to as "M station", for convenience).

The photosensitive drum 30d, the charger 32d, the developing roller 33d, the toner cartridge 34d, and the cleaning case 31d are used as a set, and configure an image forming station for forming a yellow image (hereinafter referred to as "Y station", for convenience).

Each of the photosensitive drums has a photosensitive layer on a surface thereof. In addition, the photosensitive drums are disposed evenly spaced apart to one another in the X-axis direction by using the longitudinal direction as the Y-axis direction. Note that each photosensitive drum is rotated by an unillustrated rotation mechanism in the clockwise direction (the direction shown by arrows) in FIG. 1. In addition, the photosensitive drums may be unevenly spaced apart to one another in the X-axis direction.

Each of the chargers evenly charges the surface of the corresponding photosensitive drum.

The optical scanning device 100 irradiates modulated light of each color based on multicolor image information (black image information, cyan image information, magenta image information, and yellow image information) from an upper-level device, such as a personal computer, onto the surface of the corresponding charged photosensitive drum. Thereby, electric charges disappear only from a portion on the surface of each photosensitive drum where light is irradiated. As a result, a latent image corresponding to the image information is formed on the surface of each of the photosensitive drums. The latent image thus formed moves towards the corresponding developing roller as each photosensitive drum rotates. Note that the configuration of the optical scanning device 100 will be described later.

The toner cartridge 34a stores black toner therein. The toner is supplied to the developing roller 33a. The toner cartridge 34b stores cyan toner therein. The toner is supplied to the developing roller 33b. The toner cartridge 34c stores magenta toner therein. The toner is supplied to the developing roller 33c. The toner cartridge 34d stores yellow toner therein. The toner is supplied to the developing roller 33d.

The toner from the corresponding toner cartridge is evenly and thinly applied onto the surface of the developing roller with its rotation. After that, once the toner on the surface of each of the developing rollers comes in contact with the surface of the corresponding photosensitive drum, the toner moves only to the portion on the surface where light is irradiated and then adheres thereonto. That is, each developing roller causes the toner to adhere onto the latent image formed on the surface of the corresponding photosensitive drum. Thereby, the toner is visualized. An image to which the toner adheres (hereinafter referred to as "a toner image", for convenience) moves towards the transfer belt 40 with the rotation of the photosensitive drum.

The toner images of black, cyan, magenta, and yellow are sequentially transferred and superimposed on the transfer belt 40 at predetermined timing. As a result, a color image is formed.

The paper feed tray 60 stores recording paper. The paper feed roller 54 is disposed in a vicinity of the paper feed tray 60, takes a sheet of the recording paper one by one, and sends it to the resist roller pair 56. The resist roller pair 56 sends out the recording paper to the transfer belt 40 at predetermined timing. Thereby, the color image on the transfer belt 40 is transferred onto the recording paper. The recording paper onto which the color image is transferred is sent to the fixing roller 50.

The fixing roller 50 applies heat and pressure to the recording paper. Thereby, the toner is fixed on the recording paper. The recording paper on which the toner is fixed is sent to the paper discharge tray 70 through the paper discharging roller 58 and is sequentially stacked on the paper discharge tray 70.

Each of the cleaning cases removes toner residual (residual toner) on the surface of the corresponding photosensitive drum. The surface of the photosensitive drum from which the residual toner is removed returns again to the position of the corresponding charger.

Figure 2:
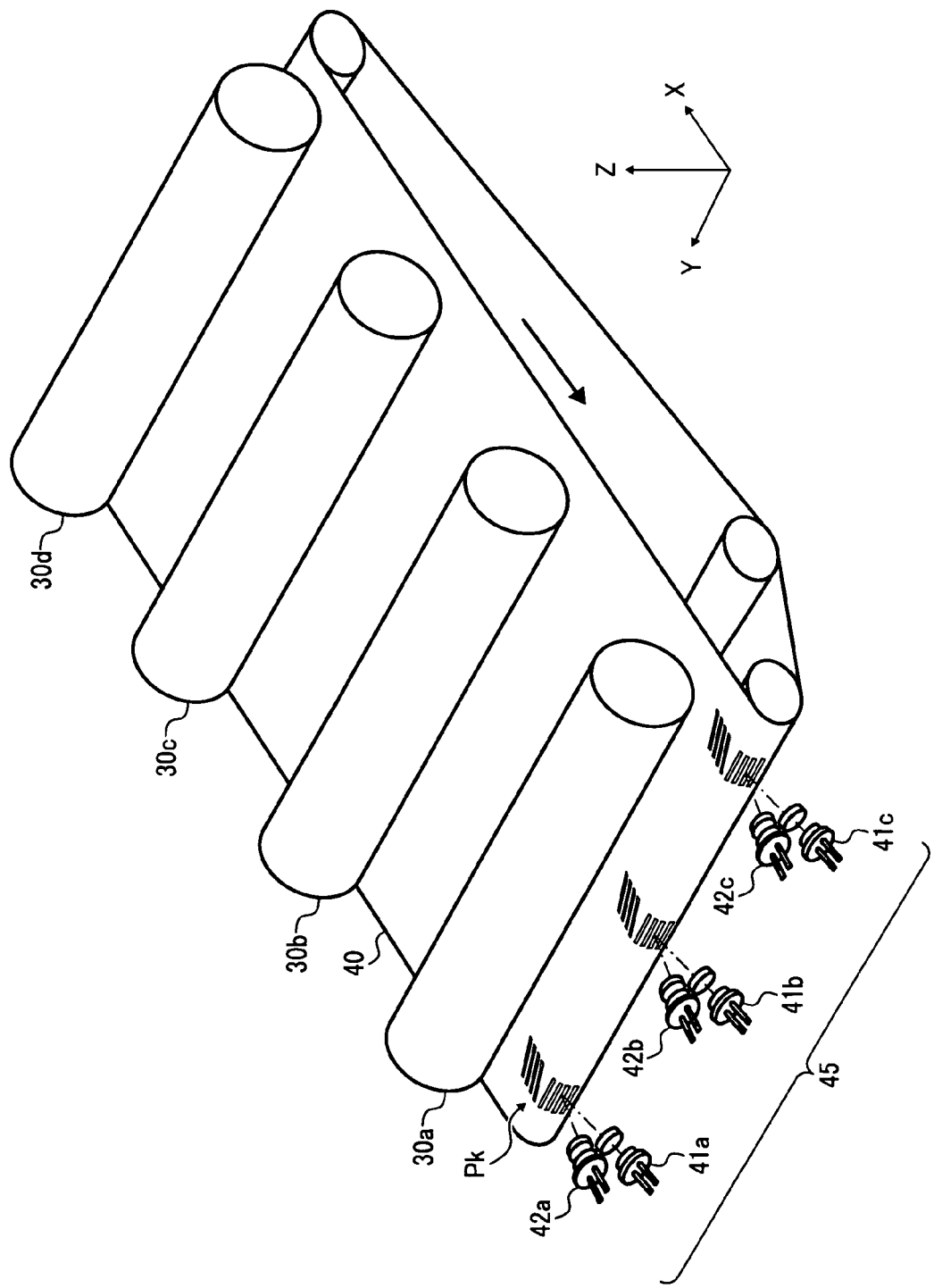
FIG. 2 is a view for illustrating the configuration of a displacement detector in FIG. 1.

The displacement detector 45 is disposed on the −X side of the transfer belt 40. As shown in FIG. 2, the displacement detector 45 includes an LED 42a for illuminating an end portion on the +Y side of the transfer belt 40 (it is set to be the detection position 0), a photosensor 41a for receiving reflected light thereof, an LED 42b for illuminating the center portion of the transfer belt 40 (it is set to be the detection position 1), a photosensor 41b for receiving reflected light thereof, an LED 42c for illuminating an end portion on the −Y side of the transfer belt 40 (it is set to be the detection position 2), and a photosensor 41c for receiving reflected light thereof.

As shown in FIG. 2, the displacement detector 45 illuminates, with the LEDs, each of three detection patterns Pk formed in the detection positions, and receives the reflected light beams by the photosensors. Thereby, the displacement detector 45 outputs multiple signals including various kinds of displacement information, such as inclination displacement and resist displacement in the main scanning direction (hereinafter referred to as "main scanning resist displacement", for convenience), on each of the C station, M station, and Y station by using the K station as a reference. Note that the longitudinal direction of each photosensitive drum is the main scanning direction and the direction perpendicular to the main scanning direction is the sub-scanning direction.

Figure 3:
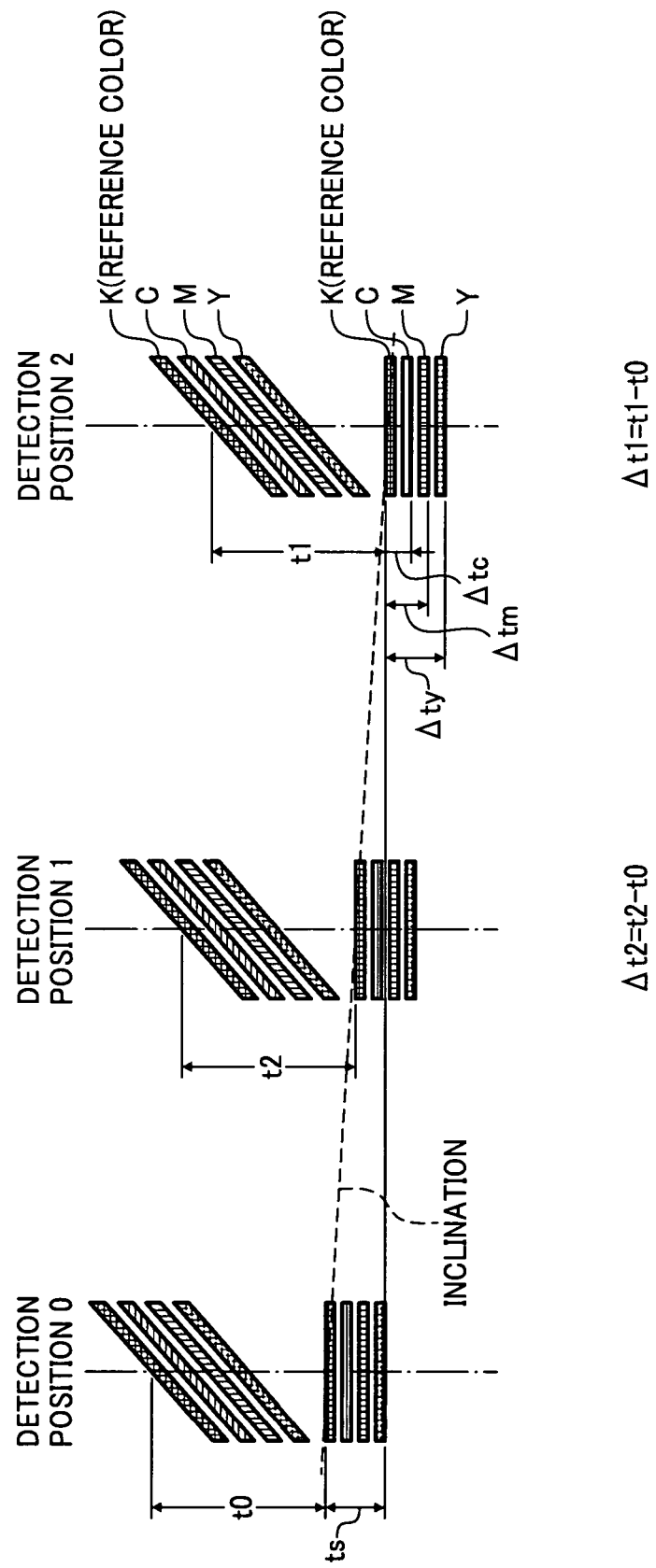
FIG. 3 is a view for illustrating a detection pattern in FIG. 2.

As shown in FIG. 3 as an example, each detection pattern Pk is formed of a first line group which is disposed so that the longitudinal direction thereof would be parallel to the main scanning direction and a second line group which is disposed so that the longitudinal direction thereof would be at an inclination of 45° from the man scanning direction. The vertical direction in FIG. 3 is the moving direction of the transfer belt 40. The positional displacement in the sub-scanning direction can be obtained from a difference between detection time differences Δty, Δtm, and Δtc in the first line group in each detection position. Similarly, the positional displacement in the main scanning direction can be obtained from differences between t1 and t0 and between t2 and t0 in FIG. 3. The positional displacement in both the sub-scanning direction and the main scanning direction can be obtained for each station (see, for example, Japanese Patent No. 3644923).

(Optical Scanning Device)

Next, the configuration of the optical scanning device 100 will be described.

Figure 4:
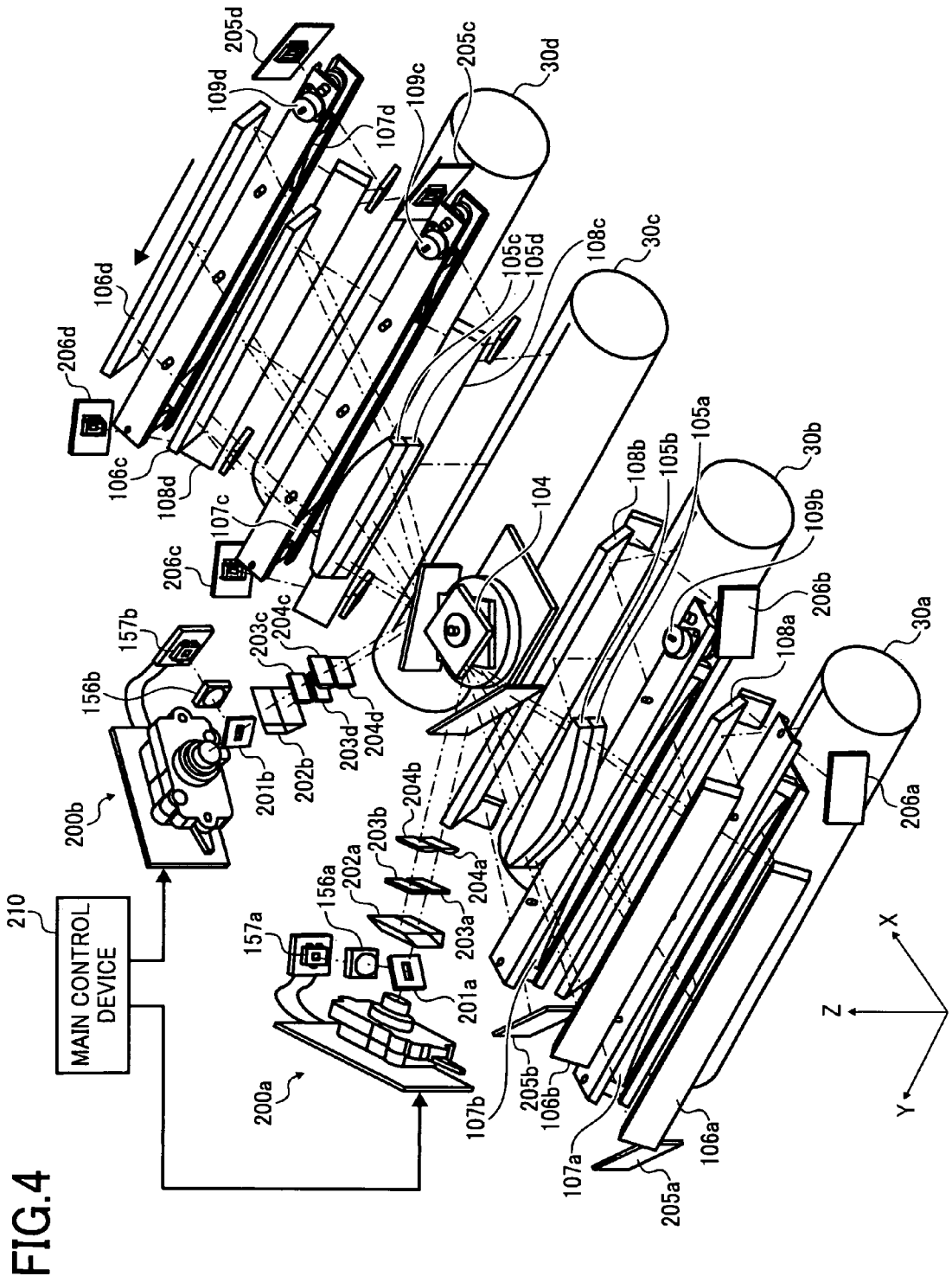
FIG. 4 is a perspective view showing an optical scanning device in FIG. 1.

As shown in FIG. 4 as an example, the optical scanning device 100 includes two light source units 200a and 200b, two opening plates 201a and 201b, two beam splitting prisms 202a and 202b, four liquid crystal deflectors 203a to 203d, four cylinder lenses 204a to 204d, a polygon mirror 104, four fθ lenses 105a to 105d, eight reflection mirrors 106a to 106d and 108a to 108d, four toroidal lenses 107a to 107d, eight photodetector sensors 205a to 205d and 206a to 206d, a main control device 210, two condenser lenses 156a and 156b, and two photoreceptors 157a and 157b.

The light source units 200a and 200b have similar configurations with each other. Therefore, the light source unit 200b will be representatively described and the description of the light source unit 200a will be omitted.

Figure 5:
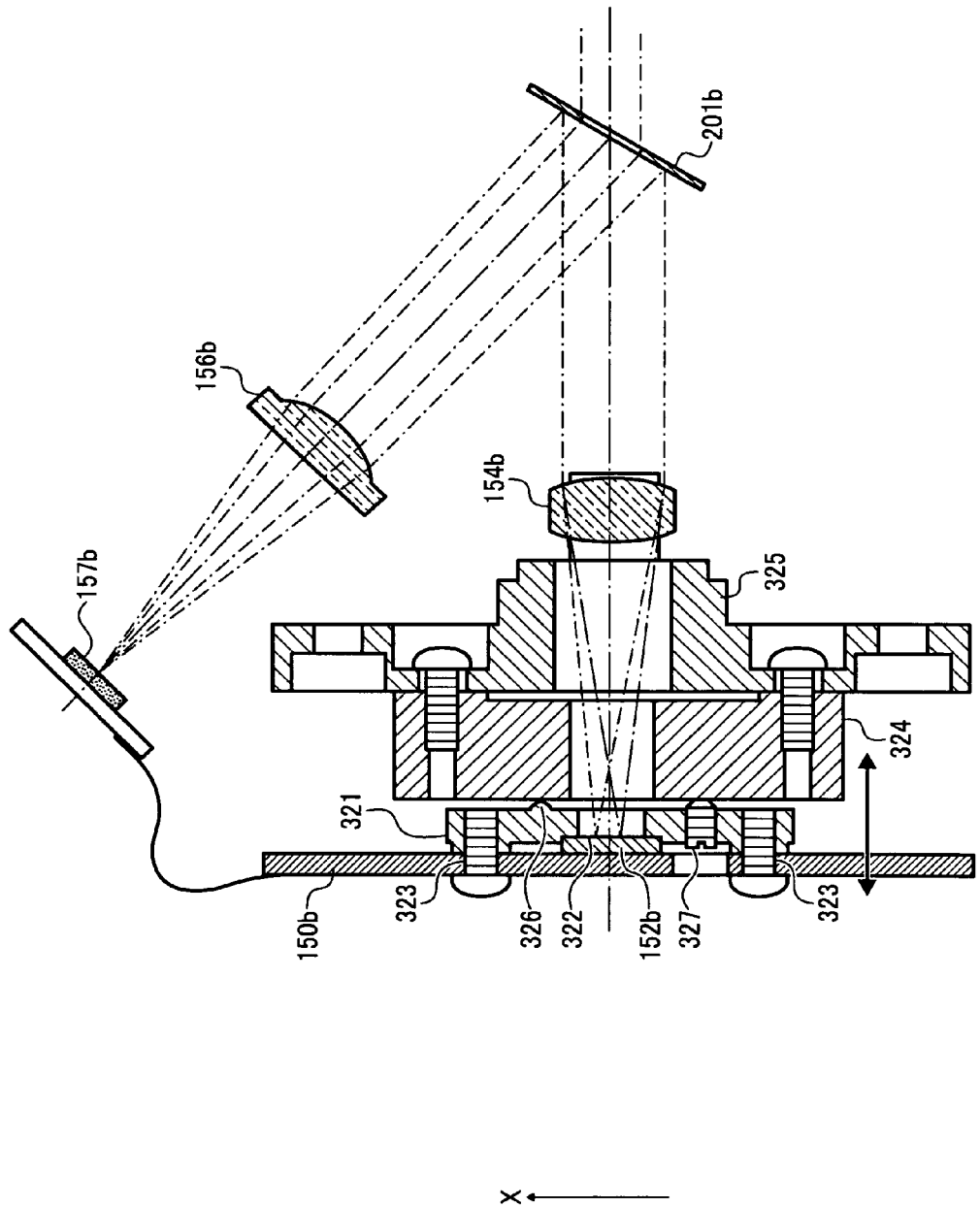
FIG. 5 is a view for illustrating the configuration of a light source unit in FIG. 4.
Figure 6:
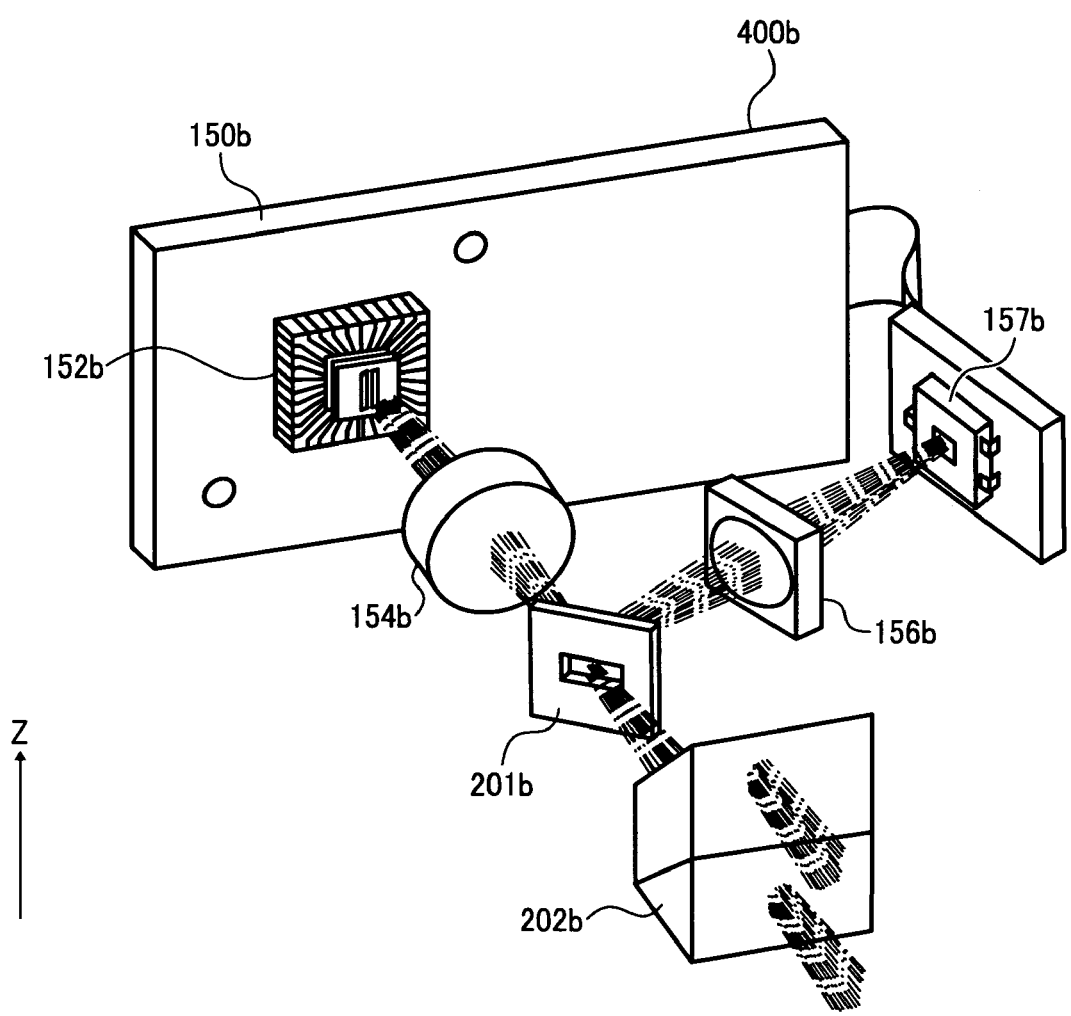
FIG. 6 is a perspective view showing a main part of the light source unit.

As shown in FIGS. 5 and 6, the light source unit 200b includes a control substrate 150b, a laser array 152 and a control circuit 400b (omitted in FIG. 5), which are mounted on the control substrate 150b, a coupling lens 154b, a holder member 325 (omitted in FIG. 6) for holding the coupling lens 154b, a base member (omitted in FIG. 6) disposed between the control substrate 150b and the holder member 325, and the like. Here, the base member is formed of a first member 321 for holding the control substrate 150b and a second member 324 which is disposed between the first member 321 and the holder member 325 and fixes the first member 321 against the holder member 325.

Figure 7:
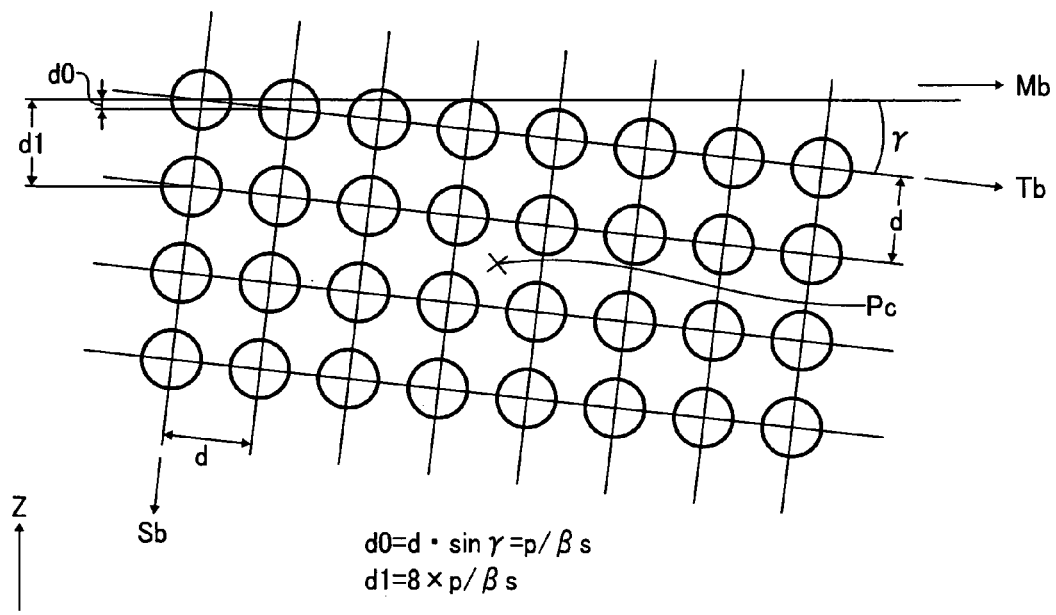
FIG. 7 is a view for illustrating the arrangement of light-emitting units of a laser array in FIG. 6.

As shown in FIG. 7 as an example, the laser array 152b has the configuration in which a surface emitting semiconductor laser array chip having 32 light-emitting units formed on one substrate is accommodated in a ceramic package having a lead terminal.

The laser array 152b has four columns of the light-emitting units, each of which has eight light-emitting units evenly spaced apart (with an interval d) along the direction inclined by γ degree (hereinafter referred to as "Tb direction", for convenience) from the direction corresponding toward the main scanning direction (hereinafter referred to as "Mb direction", for convenience) to the direction corresponding to the sub-scanning direction (here, the Z-axis direction). These four columns of the light-emitting units are arranged so as to be evenly spaced apart (with an interval d) in the direction perpendicular to the Tb direction (hereinafter referred to as "Sb direction", for convenience). That is, the 32 light-emitting units are two-dimensionally arranged along each of the Tb and Sb directions. For convenience, the columns of the light-emitting units are respectively referred to as first to fourth columns of the light-emitting units from top to bottom in FIG. 7. Note that the "light-emitting interval" means a center-to-center distance between the two adjacent light-emitting units.

Accordingly, the photosensitive drums 30c and 30d can be simultaneously scanned with 32 light beams. Note that the polarization directions of light from the light-emitting units are the same.

And now, there is a relationship which is expressed by the following formula (1);

$$\sin \gamma = p/(d\, \beta s) \quad (1)$$

where an interval (a line pitch) between two adjacent scanning lines in the photosensitive drum 30c or 30d is p and a magnification (a sub-scanning magnification) of an optical system leading light from the laser array 152b to the photosensitive drum 30c or 30d in the sub-scanning direction is βs.

An interval d0 between the light-emitting units in the Z-axis direction of the two adjacent light-emitting units in each column of the light-emitting units is expressed by the following formula (2). In addition, an interval d1 in the Z-axis direction of the two adjacent columns of the light-emitting units is expressed by the following formula (3).

$$d0 = d \times \sin \gamma = p/\beta s \quad (2)$$

$$d1 = 8 \times p/\beta s \quad (3)$$

Figure 8:
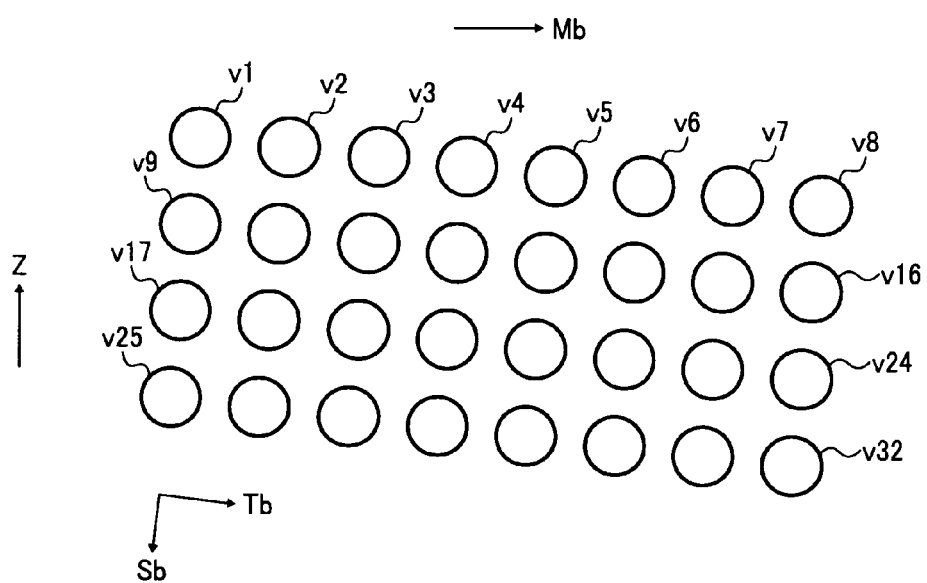
FIG. 8 is a view for illustrating reference numerals given to the light-emitting units of the laser array.

To specify each light-emitting unit, as shown in FIG. 8, for convenience, from the upper left to the lower right in the Figure, the eight light-emitting units forming the first column of the light-emitting units are set to be v1 to v8, the eight light-emitting units forming the second column of the light-emitting units are set to be v9 to v16, the eight light-emitting units forming the third column of the light-emitting units are set to be v17 to v24, and the eight light-emitting units forming the fourth column of the light-emitting units are set to be v25 to v32.

Return to FIG. 5. The holder member 325 and the second member 324 being the base member are joined and fastened by screws so that the joined surface would be parallel to a reference surface perpendicular to the optical axis of the coupling lens 154b. Note that the holder member 325 is formed of resin and the first and second members 321 and 324 are formed of aluminum diecast.

An abutment surface 322 of the first member 321 abuts on a surface (an emission surface) formed in parallel to an arrangement surface of the multiple light-emitting units in the laser array 152b. The first member 321 is screwed by two braces 323 onto the control substrate 150b so as to hold the laser array 152b therebetween. That is, the abutment surface 322 is an attachment portion of the laser array 152b where the layer array 152b is positioned.

The second member 324 is joined onto the first member 321 through three points of two abutment points disposed in a direction corresponding to the main scanning direction across the attachment portion of the laser array 152b (two projected portions 326 formed on the first member 321, only one of which is shown in FIG. 5 because they overlap with one another) and the tip end portion of an adjustment screw 327 screwed onto the first member 321. Thus, the amount of the adjustment screw 327 is increased or decreased, so that the inclination of the attachment portion of the laser array 152b is made adjustable on the so-called main scanning cross-section by using the two projected portions 326 as bearings. By adjusting the inclination and the arrangement of the coupling lens 154b (adjustment of an interval with the laser array 152b in the optical axis direction), positions of the light-emitting units arranged in the end portion of the direction corresponding to the main scanning direction in relation to the coupling lens 154b can be adjusted.

That is, the inclination and position of the laser array 152b in relation to the coupling lens 154b are adjustable. Here, the emission surface of the laser array 152b is perpendicular to the optical axis direction of the coupling lens 154b. In addition, the optical axis of the coupling lens 154b is adjusted so as to pass through the center of the emission surface of the laser array 152b (Pc in FIG. 7). That is, the 32 light-emitting units are symmetrical to the optical axis of the coupling lens 154b.

The coupling lens 154b makes light from the laser array 152b substantially parallel light.

Figure 9:
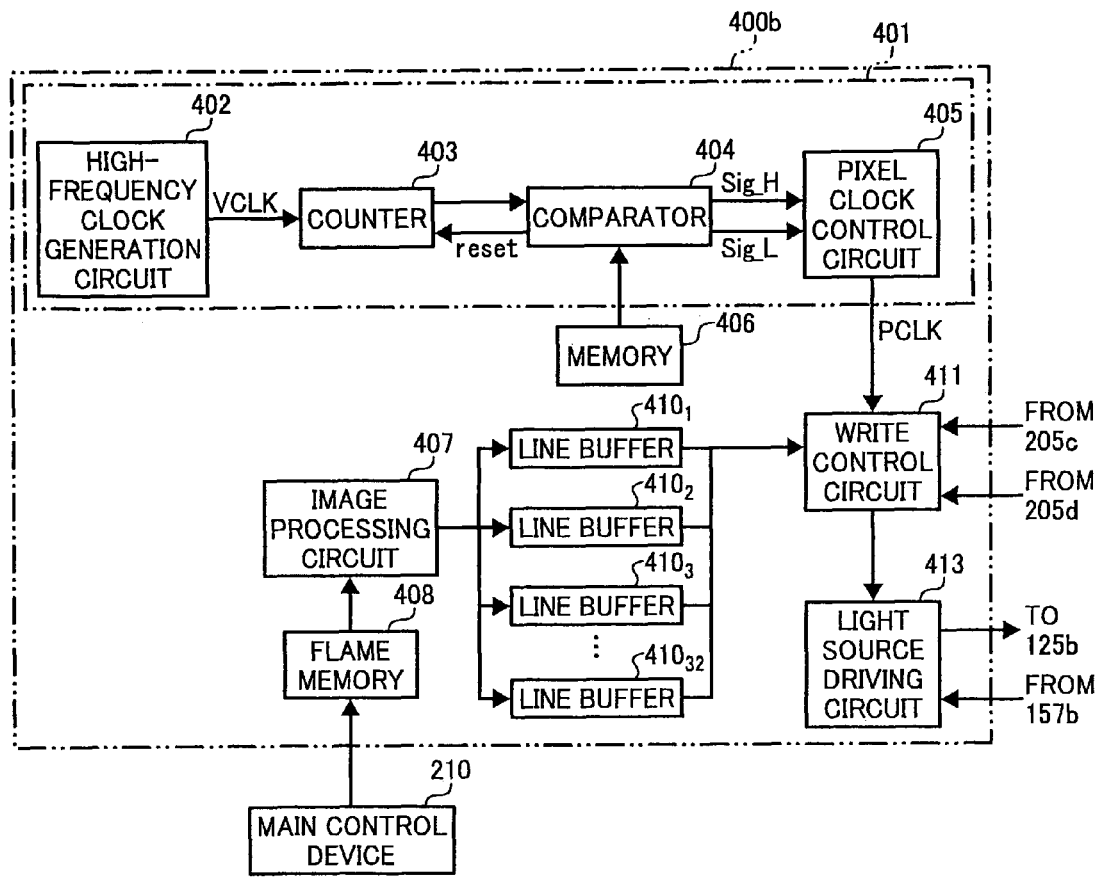
FIG. 9 is a block diagram of a control circuit in FIG. 6.

As shown in FIG. 9, the control circuit 400b includes a pixel clock generation circuit 401, a memory 406, an image processing circuit 407, a flame memory 408, line buffers $410_1$ to $410_{32}$, a write control circuit 411, and a light source driving circuit 413. Note that arrows in FIG. 9 show representative flows of signals and information and do not show all relationships of connections among block sections.

Furthermore, the pixel clock generation circuit 401 has a high-frequency clock generation circuit 402, a counter 403, a comparator 404, and a pixel clock control circuit 405.

The high-frequency dock generation circuit 402 generates high-frequency clock signals VCLK.

The counter 403 counts the high-frequency clock signals VCLK outputted from the high-frequency clock generation circuit 402, and outputs the counted value to the comparator 404.

The comparator 404 compares a counted value outputted from the counter 403 with a set value L and phase data H. The set value L is preset according to a duty ratio stored in the memory 406 and the phase data H indicating a phase shift amount is externally supplied as transition timing of a pixel clock. After that, the comparator 404 changes a control signal sig_L from the low-level (=0) to the high-level (=1) when the counted value agrees with the set value L. In addition, the comparator 404 changes a control signal sig_H from the low-level (=0) to the high-level (=1) when the counted value agrees with the phase data H, and then outputs a reset signal reset to the counter 403.

The pixel clock control circuit 405 outputs a pixel clock signal PCLK which will be the high-level (=1) at the falling edge of the control signal sig_L from the comparator 404 and the low-level (=0) at the falling edge of the control signal sig_H. As described above, a continuous pulse train is formed. Here, a pixel clock signal with corrected magnification displacement on the photosensitive drum 30c is generated at the timing when a scanning object is at the photosensitive drum 30c. Moreover, a pixel clock signal with corrected magnification displacement on the photosensitive drum 30d is generated at the timing when a scanning object is at the photosensitive drum 30d. Note that the pixel clock signal PCLK can be phase-modulated with ⅛ clock resolution. In addition, the above-described phase data H is supplied for every one clock of the pixel clock signal PCLK.

Figure 10:
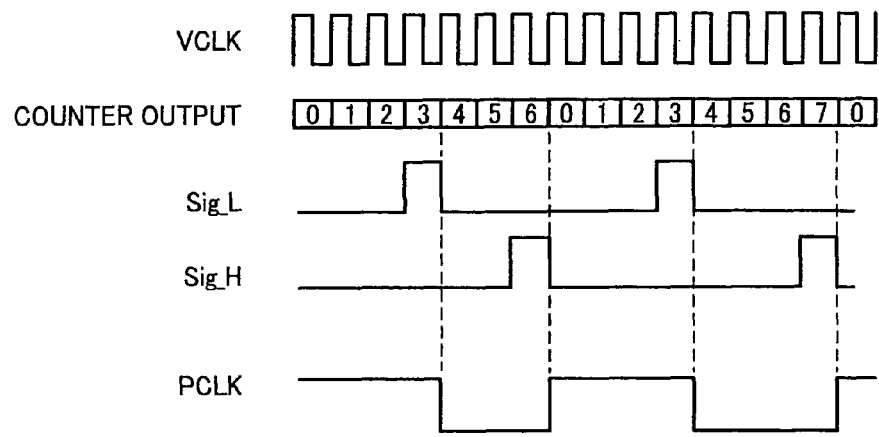
FIG. 10 is a timing chart for illustrating phase modulation of a pixel clock signal.

FIG. 10 shows an example of the pixel clock signal PCLK whose phase is delayed by ⅛ clock. Here, the duty ratio is set to be 50% and the set value is L=3. The control signal sig_L changes from the low-level to the high-level when the counted value becomes 3, and changes from the high-level to the low-level at the next counted value (here, 4). The pixel dock signal PCLK changes from the high-level to the low-level at this timing. When a phase is delayed by ⅛ clock, phase data H=6 is supplied. The control signal sig_H changes from the low-level to the high-level when the counted value becomes 6 and changes from the high-level to the low-level at the next counted value (here, 0). Then, the pixel clock signal PCLK changes from the low-level to the high-level at this timing. After that, the pixel clock signal PCLK changes to the low-level when the counted value is 4. That is, an adjacent pulse period in the pixel clock signal PCLK is shortened by ⅛ clock.

The flame memory 408 temporarily stores raster-developed image data (hereinafter referred to as "raster data") sent from the main control device 210. Here, the density of one pixel is converted into a 4×4 dot configuration, while referring to the previous and next data, on the basis of the magenta and yellow raster data for each page sent from the main control device 210. Then, the pixel is separately stored.

The image processing circuit 407 reads out the raster data stored in the flame memory 408 and performs predetermined halftone processing. Thereafter, the image processing circuit 407 creates dot data for each light-emitting unit and outputs dot data to the line buffers $410_1$ to $410_{32}$ corresponding one of each light-emitting units. Note that one pixel is formed with 4×4(=16) bits as an example here. That is, one light spot formed on the photosensitive drum corresponds to one dot. In addition, the light-emitting unit at the start of writing is determined so that a sub-scanning resist displacement with integral multiplication of one line pitch would be corrected.

Once the start of scan in the M station is detected on the basis of an output signal from the photodetector sensor 205c, the write control circuit 411 reads out the dot data (here, magenta dot data) of the light-emitting units from the line buffers 410₁ to 410₃₂. Thereafter, the readout dot data is superimposed on the pixel clock signal PCLK outputted from the pixel clock generation circuit 401. In addition, the write timing is adjusted so that a main scanning resist displacement in the M station would be corrected. Thereby, separate modulated data is generated for each light-emitting unit.

In addition, once the start of scan in the Y station is detected based on an output signal from the photodetector sensor 205d, the write control circuit 411 reads out dot data (here, yellow dot data) of the light-emitting units from the line buffers 410₁ to 410₃₂. Thereafter, the readout dot data is superimposed on the pixel clock signal PCLK outputted from the pixel clock generation circuit 401. In addition, the write timing is adjusted so that a main scanning resist displacement in the Y station would be corrected. Thereby, separate modulated data is generated for each light-emitting unit.

The light source driving circuit 413 drives each of the light-emitting units of the laser array 152b according to the modulated data sent from the write control circuit 411. Note that the light source driving circuit 413 adjusts driving current at predetermined timing on the basis of the output signal of the photoreceptor 157b so that the intensity of light emitted from each of the light-emitting units would be substantially constant.

Return to FIG. 4. The opening plate 201a has an opening portion to define the beam diameter of light form the light source unit 200a. The opening plate 201b has an opening portion to define the beam diameter of light from the light source unit 200b. Each of the opening plates uses light reflected in a portion near the opening portions for monitor, and thus is disposed inclined in relation to the corresponding light source units. For this reason, the light reflected in the portion near the opening portion is prevented from returning to the light source unit.

Each of the beam splitting prisms has a half mirror surface and a mirror surface. The half mirror surface transmits half of the incident light and reflects the other half thereof, and a mirror surface is disposed in parallel to the half mirror surface on the optical path of the light reflected by the half mirror surface. That is, each beam splitting prism splits the incident light into two light beams which are parallel to each other.

The beam splitting prism 202a splits light passing through the opening portion of the opening plate 201a into two light beams with a predetermined interval (here, 6 mm) in the Z-axis direction. The beam splitting prism 202b splits light passing through the opening portion of the opening plate 201b into two light beams with a predetermined interval (here, 6 mm) in the Z-axis direction.

Figure 11A:
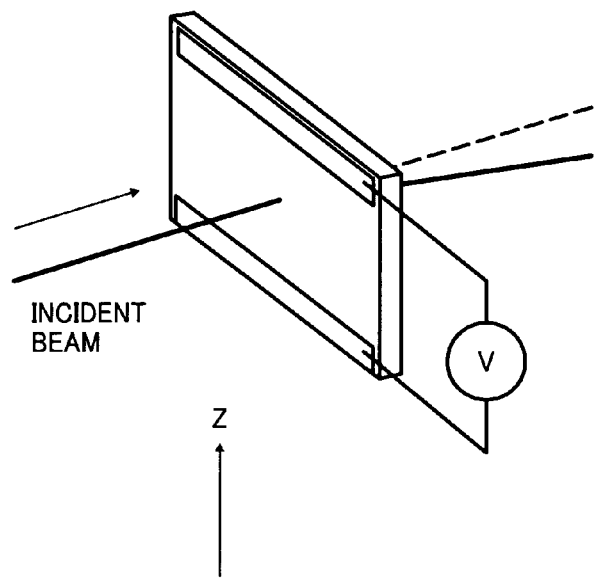
FIGS. 11A and 11B are views, each of which illustrates a liquid crystal deflector.
Figure 11B:
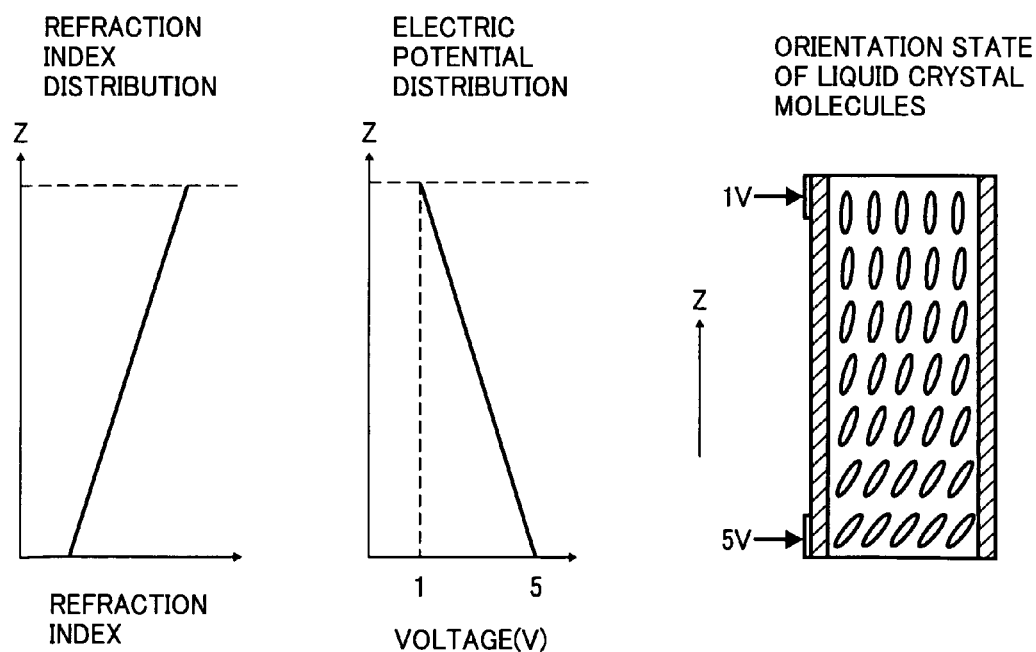

Each of the liquid crystal deflectors has the configuration in which liquid crystals are enclosed between two transparent glass plates. As shown in FIG. 11A as an example, an electrode is formed on each of the upper and lower sides of the surface of one glass plate. When a potential difference is given between the electrodes, as shown in FIG. 11B as an example, the inclination of potential is caused in the sub-scanning direction. In response to this, orientations of liquid crystals change. As a result, the inclination of refraction ratio is caused in the sub-scanning direction. Thereby, similar to the prism, the light emission axis can be slightly inclined in the sub-scanning direction. Note that nematic liquid crystals, and the like, having dielectric anisotropy, are used as liquid crystals.

The liquid crystal detector 203a is disposed on the optical path of light on the −Z side of the two light beams from the beam splitting prism 202a, and can deflect the light in the sub-scanning direction according to an applied voltage.

The liquid crystal deflector 203b is disposed on the optical path of light on the +Z side of the two light beams from the beam splitting prism 202a, and can deflect the light in the sub-scanning direction according to an applied voltage.

The liquid crystal deflector 203c is disposed on the optical path of light on the +Z side of the two light beams from the beam splitting prism 202b, and can deflect the light in the sub-scanning direction according to an applied voltage.

The liquid crystal deflector 203d is disposed on the optical path of light on the −Z side of the two light beams from the beam splitting prism 202b, and can deflect the light in the sub-scanning direction according to an applied voltage.

The cylinder lens 204a is disposed on the optical path of the light through the liquid crystal deflector 203a, and focuses the incident light in a vicinity of a mirror surface (a deflection surface) of the polygon mirror 104 in the sub-scanning direction.

The cylinder lens 204b is disposed on the optical path of the light through the liquid crystal deflector 203b, and focuses the incident light in a vicinity of the mirror surface of the polygon mirror 104 in the sub-scanning direction.

The cylinder lens 204c is disposed on the optical path of the light through the liquid crystal deflector 203c, and focuses the incident light in a vicinity of the mirror surface of the polygon mirror 104 in the sub-scanning direction.

The cylinder lens 204d is disposed on the optical path of the light through the liquid crystal deflector 203d, and focuses the incident light in a vicinity of the mirror surface of the polygon mirror 104 in the sub-scanning direction.

Thus, a defection point of light in the polygon mirror 104 and a light-condensing point on the surface of each of the photosensitive drums become conjugate in the sub-scanning direction.

Figure 12:
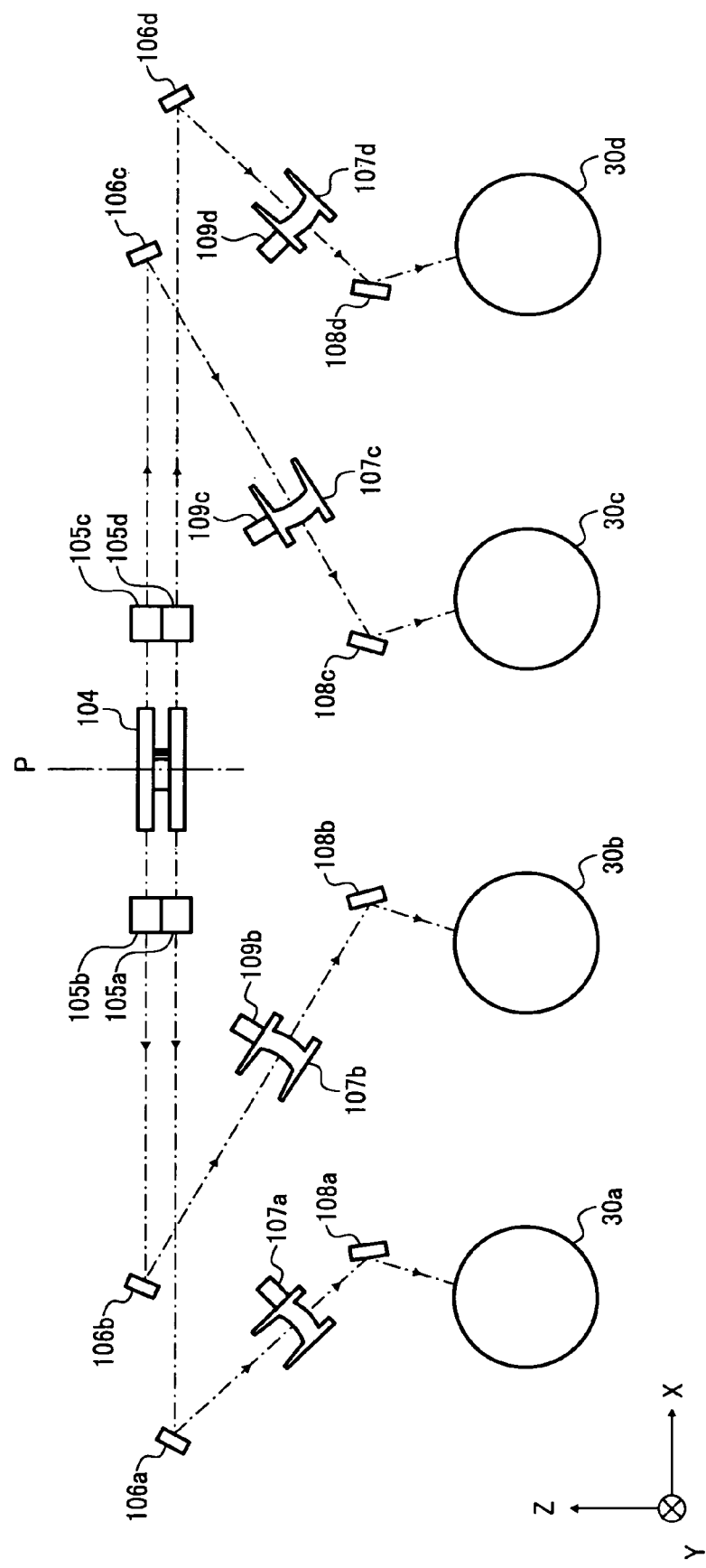
FIG. 12 is a side view showing the optical scanning device in FIG. 1.

The polygon mirror 104 is configured by four-face mirrors with a two-stage structure (see, FIGS. 4 and 12). The mirrors in the first and second stages (the lower and upper stages) are disposed so that light beams from the cylinder lenses 204a and 204d and light beams from the cylinder lenses 204b and 204c would be respectively deflected by the mirrors. Here, the center distance between the mirrors in the first and second stages is approximately 6 mm in the Z-axis direction. In addition, the mirrors in the first and second stages rotate with their phases being displaced by 45° with respect to each other. The scanning of light is alternately performed by the mirrors in the first and second stages.

The fθ lenses 105a and 105b are disposed on the −X side of the polygon mirror 104. The fθ lenses 105c and 105d are disposed on the +X side of the polygon mirror 104.

The fθ lenses 105a and 105b are stacked in the Z-axis direction. The fθ lens 105a feces the mirror surface in the first stage and the fθ lens 105b faces the mirror surface in the second stage (see, FIG. 12). In addition, the fθ lenses 105c and 105d are stacked in the Z-axis direction. The fθ lens 105c faces the mirror surface in the second stage and the fθ lens 105d feces the mirror surface in the first stage (see, FIG. 12).

Thus, the light from the cylinder lens 204a, which is deflected by the polygon mirror 104, enters the fθ lens 105a; the light from the cylinder lens 204d eaters the fθ lens 105d; the light from the cylinder lens 204b enters the fθ lens 105b; and the light from the cylinder lens 204c enters the fθ lens 105c.

Note that the face tangle error of the mirror surface of the polygon mirror 104 is corrected by each of the cylinder lenses, fθ lenses, and toroidal lenses. Here, the center distances between the fθ lenses 105a and 105b and between fθ lens 105c and 105d are substantially 6 mm in the Z-axis direction. Note that the fθ lenses and the toroidal lenses are all plastic moldings.

A spot-like image of the light transmitted by the fθ lens 105a is formed on the photosensitive drum 30a through the reflection mirror 106a, the toroidal lens 107a, and the reflection mirror 108a. That is, the reflection mirror 106a, the toroidal lens 107a, and the reflection mirror 108a form one part of the K station.

A spot-like image of the light transmitted by the fθ lens 105b is formed on the photosensitive drum 30b through the reflection mirror 106b, the toroidal lens 107b, and the reflection mirror 108b. That is, the reflection mirror 106b, the toroidal lens 107b, and the reflection mirror 108b form one part of the C station.

A spot-like image of the light transmitted by the fθ lens 105c is formed on the photosensitive drum 30c through the reflection mirror 106c, the toroidal lens 107c, and the reflection mirror 108c. That is, the reflection mirror 106c, the toroidal lens 107c, and the reflection mirror 108c form one part of the M station.

A spot-like image of the light transmitted by the fθ lens 105d is formed on the photosensitive drum 30d through the reflection mirror 106d, the toroidal lens 107d, and the reflection mirror 108d. That is, the reflection mirror 106d, the toroidal lens 107d, and the reflection mirror 108d form one part of the Y station.

Each of the fθ lenses has a non-circular arc surface, having power with which a light spot moves at a constant speed in the main scanning direction on the corresponding photosensitive drum surface with the rotation of the polygon mirror 104.

Note that the reflection mirrors are disposed so that optical paths from the polygon mirror 104 to the photosensitive drums would have the same length, and the entering positions and entering angles of the light beams in the photosensitive drums would be the same.

Each of the toroidal lenses is supported by a housing so that it can be elastic in the longitudinal direction even if thermal expansion is caused and linearity of bus can be maintained. In addition, an end portion on the +Y side of the housing of each toroidal lens is fixed to the housing.

A stepping motor 109b is provided at an end portion on the −Y side of the housing of the toroidal lens 107b. Then, the stepping motor 109b is driven so that the toroidal lens 107b can be rotated on the surface vertical to the optical axis thereof.

A stepping motor 109c is provided at an end portion on the −Y side of the housing of the toroidal lens 107c. Then, the stepping motor 109c is driven so that the toroidal lens 107c can be rotated on the surface vertical to the optical axis thereof.

A stepping motor 109d is provided at an end portion on the −Y side of the housing of the toroidal lens 107d. Then, the stepping motor 109d is driven so that the toroidal lens 107d can be rotated on the surface vertical to the optical axis thereof.

All of the photodetector sensors are disposed in positions equivalent to image surfaces. In addition, each of the photodetector sensors outputs a signal (a photoelectric conversion signal) corresponding to the volume of light received.

The photodetector sensor 205a is disposed in a position where light immediately before starting scanning, which has passed through the toroidal lens 107a, enters. Thus, the start of scanning in the photosensitive drum 30a can be detected from the output signal of the photodetector sensor 205a.

The photodetector sensor 205b is disposed in a position where light immediately before starting scanning, which has passed through the toroidal lens 107b, enters. Thus, the start of scanning in the photosensitive drum 30b can be detected from the output signal of the photodetector sensor 205b.

The photodetector sensor 205c is disposed in a position where light immediately before starting scanning, which has passed through the toroidal lens 107c, enters. Thus, the start of scanning in the photosensitive drum 30c can be detected from the output signal of the photodetector sensor 205c.

The photodetector sensor 205d is disposed in a position where light immediately before starting scanning, which has passed through the toroidal lens 107d, enters. Thus, the start of scanning in the photosensitive drum 30d can be detected from the output signal of the photodetector sensor 205d.

That is, the photodetector sensors 205a to 205d are photodetector sensors on the start side of scanning.

The photodetector sensor 206a is disposed so that light immediately after finishing scanning, which has passed through the toroidal lens 107a, would enter. Thus, the end of scanning in the photosensitive drum 30a can be detected from the output signal of the photodetector sensor 206a.

The photodetector sensor 206b is disposed so that light immediately after finishing scanning, which has passed through the toroidal lens 107b, would enter. Thus, the end of scanning in the photosensitive drum 30b can be detected from the output signal of the photodetector sensor 206b.

The photodetector sensor 206c is disposed so that light immediately after finishing scanning, which has passed through the toroidal lens 107c, would enter. Thus, the end of scanning in the photosensitive drum 30c can be detected from the output signal of the photodetector sensor 206c.

The photodetector sensor 206d is disposed so that light immediately after finishing scanning, which has passed through the toroidal lens 107d, would enter. Thus, the end of scanning in the photosensitive drum 30d can be detected from the output signal of the photodetector sensor 206d.

Figure 13:
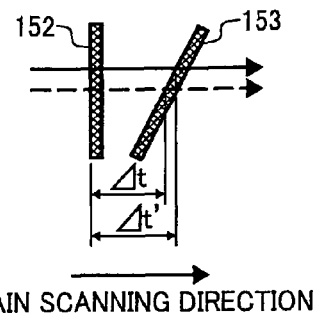
FIG. 13 is a view for illustrating the configuration of a photodetector sensor disposed on an end side of scanning.

Each of the photodetector sensors 206a to 206d has, as shown in FIG. 13 as an example, two longitudinal photodiodes 152 and 153, which are disposed in distinct positions in the main scanning direction. The photodiode 152 is disposed so that the longitudinal direction thereof would be vertical to the main scanning direction. The photodiode 153 is disposed so that the longitudinal direction thereof would be inclined from the main scanning direction toward the sub-scanning direction.

The condenser lens 156a is disposed on the optical path of the light reflected by the opening plate 201a and condenses the light reflected by the opening plate 201a. The condenser lens 156b is disposed on the optical path of the light reflected by the opening plate 201b and condenses the light reflected by the opening plate 201b.

The photoreceptor 157a is disposed in a position condensing the light through the condenser lens 156a and receives the light through the condenser lens 156a. The photoreceptor 157b is disposed in a position condensing the light through the condenser lens 156b and receives the light through the condenser lens 156b.

In addition, each of the photoreceptors outputs a signal (a photoelectric conversion signal) corresponding to the volume of light received.

Figure 14:
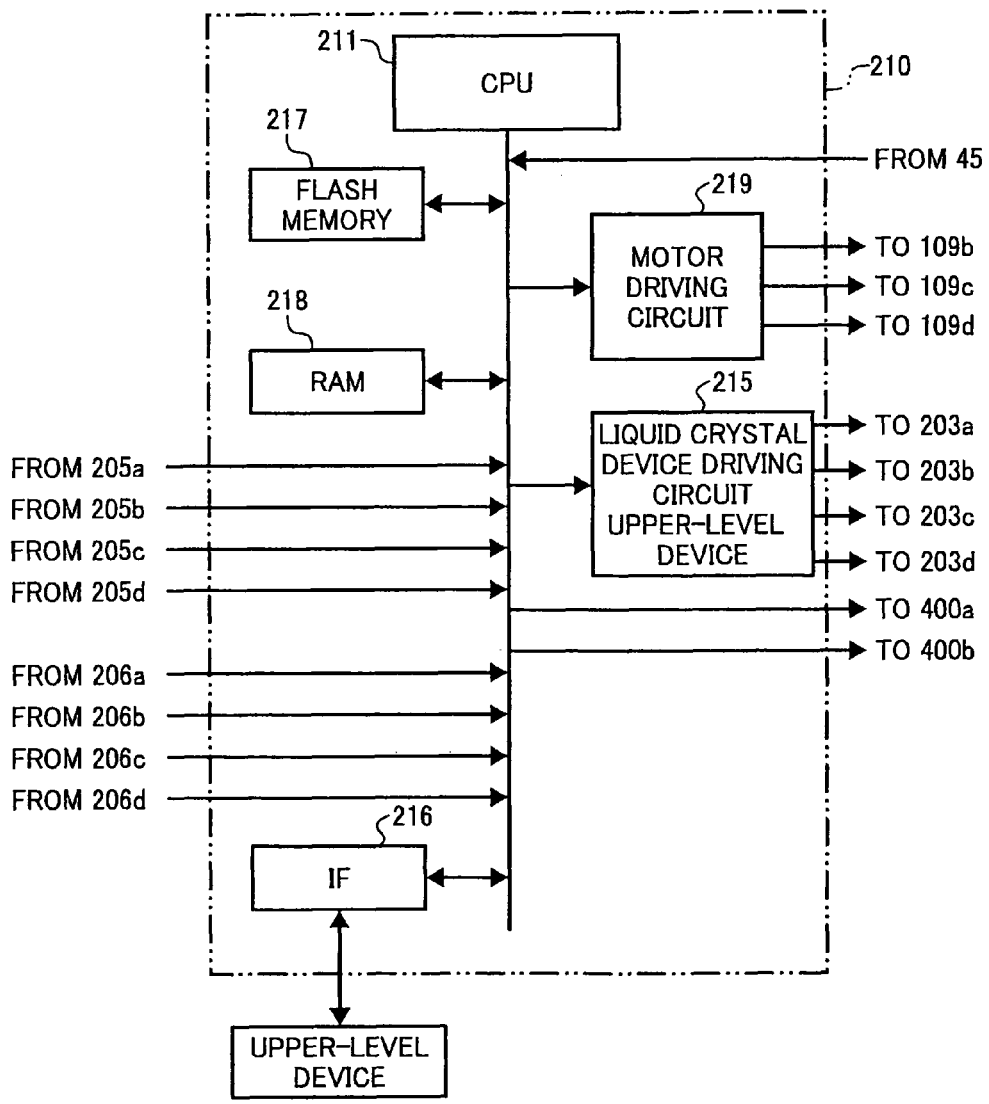
FIG. 14 is a block diagram of a main control circuit in FIG. 4.

As shown in FIG. 14, the main control device 210 includes a CPU 211, a liquid crystal device driving circuit 215, an interface (IF) 216, a flash memory 217, a RAM 218, a motor driving circuit 219, and the like. In addition, the main control device 210 is supplied of output signals from the photodetector sensors and the displacement detector 45.

The flash memory 217 stores various kinds of programs including a program according to the present invention, which is described in codes readable by the CPU 211, and property data of laser arrays.

The RAM 218 is a working memory.

The CPU 211 operates according to programs stored in the flash memory 217 and controls the entire optical scanning device 100.

Firstly, a displacement is detected based on an output signal from the displacement detector 45 at predetermined timing, such as at timing when power is turned on, stand-by state is recovered, a predetermined number of sheets of paper are printed, or the like. Thereafter, the resist in the main scanning direction, the magnification, the resist in the sub-scanning direction, and the inclination are calculated from patterns. Thereby, the write timing and write clock are adjusted and the inclination is corrected. In general, a reference value (an initial state) set here is held until the next detection timing of the displacement detector 45.

In the present embodiment, to keep the displacement to the minimum until the next detection timing, in the main scanning magnification, the displacement of scanning time is always measured and corrected by using the scanning time from the photodetector sensor 205a to the photodiode 152 of the photodetector sensor 206a in the initial state as a reference. In addition, based on an output signal from each photodetector sensor, the resist displacement in the sub-scanning direction in each photosensitive drum is always measured as a displacement of a time difference by using a time difference Δt between the time from the photodetector sensor 205a to the photodiode 152 of the photodetector sensor 206a in the initial state and the time of the scanning light scanning from the photodetector sensor 205a to the photodiode 153 of the photodetector sensor 206a as a reference. The time difference is converted into a change amount of scanning position in the sub-scanning direction. If the amount is one line pitch or more, the timing in the sub-scanning direction is corrected. If the amount is leas than one line pitch, the timing is corrected by the liquid crystal deflectors. In this manner, it is intended that changes from the initial state would not be caused.

In the present embodiment, one pixel is formed of 4×4 dots as an example. In this case, four light-emitting units are used for forming one pixel. Tb correct the sub-scanning resist displacement with integral multiplication of one line pitch, there is a case where a light-emitting unit at the start of writing is different. Thus, there are three combinations of the four light-emitting units.

Figure 15A:
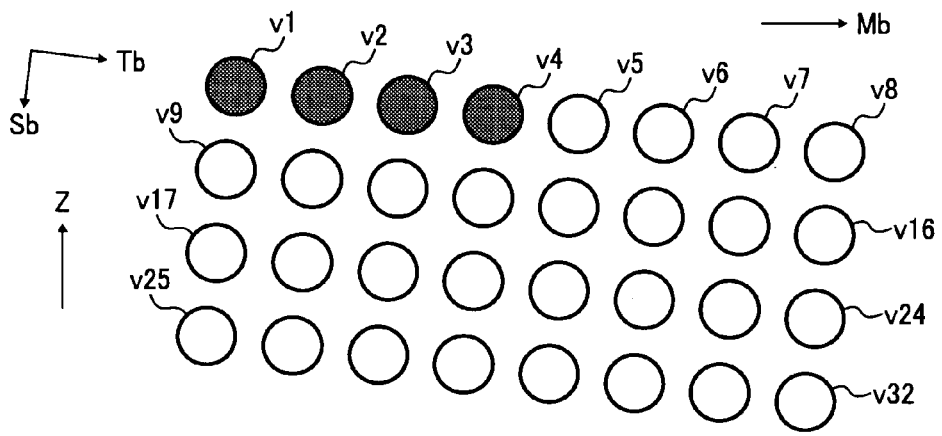
FIGS. 15A to 15C are views, each of which illustrates a first pattern of a combination of the light-emitting units.
Figure 15B:
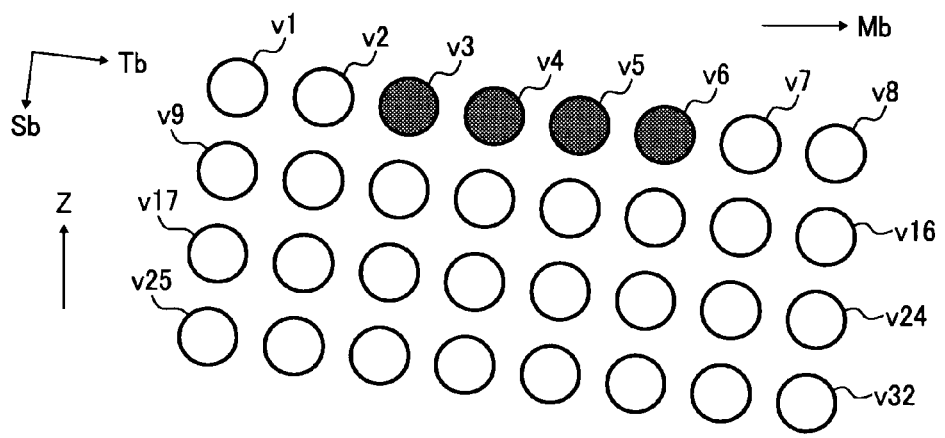
Figure 15C:
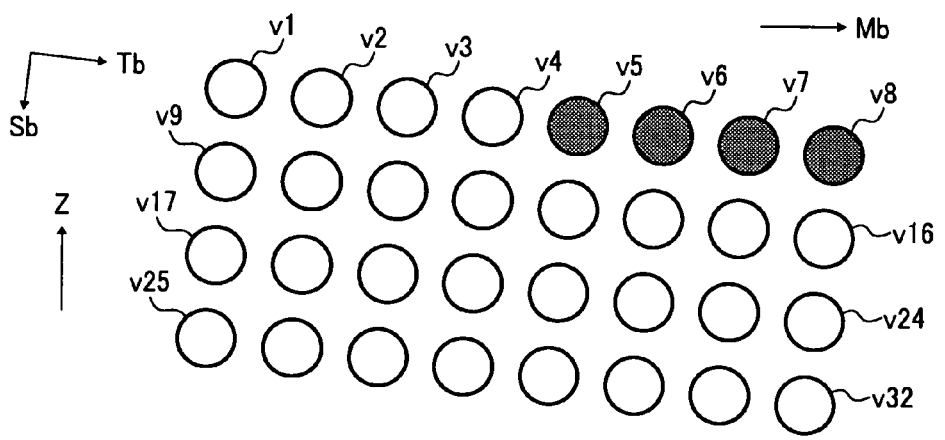

As shown in FIGS. 15A to 15C as an example, a first combination uses four light-emitting units which belong to the same column of the light-emitting units and are continuously arranged in the Tb direction (that is, v1 to v4 in FIG. 15A, v3 to v6 in FIG. 15B, and v5 to v8 in FIG. 15C). Hereinafter the first combination is referred to as "a first pattern" for convenience. In addition, the four light-emitting units of the first pattern are collectively referred to as "a first group of the light-emitting units".

Figure 16A:
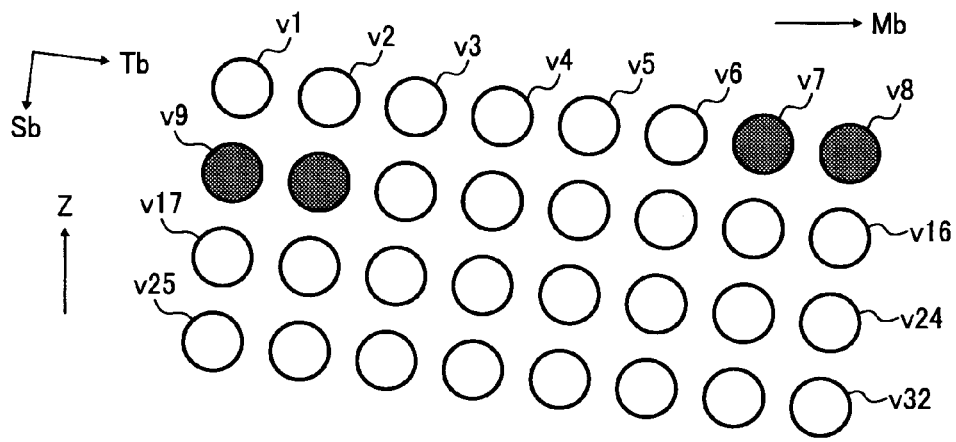
FIGS. 16A to 16C are views, each of which illustrates a second pattern of a combination of the light-emitting units.
Figure 16B:
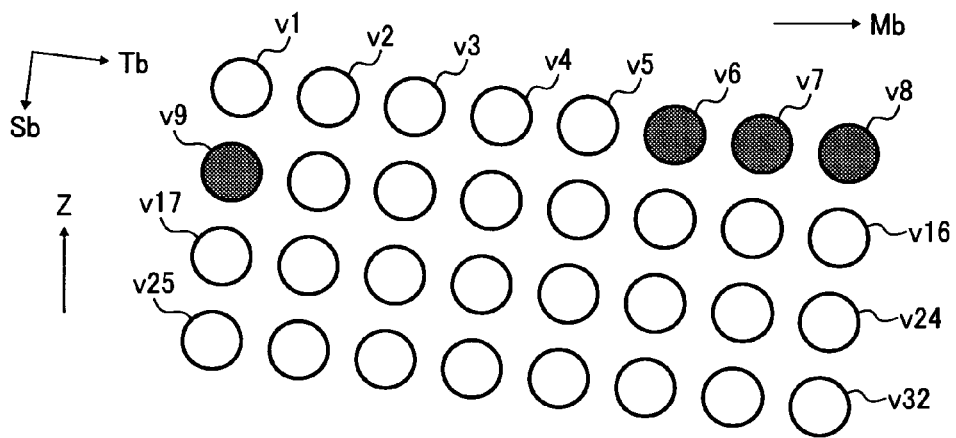
Figure 16C:
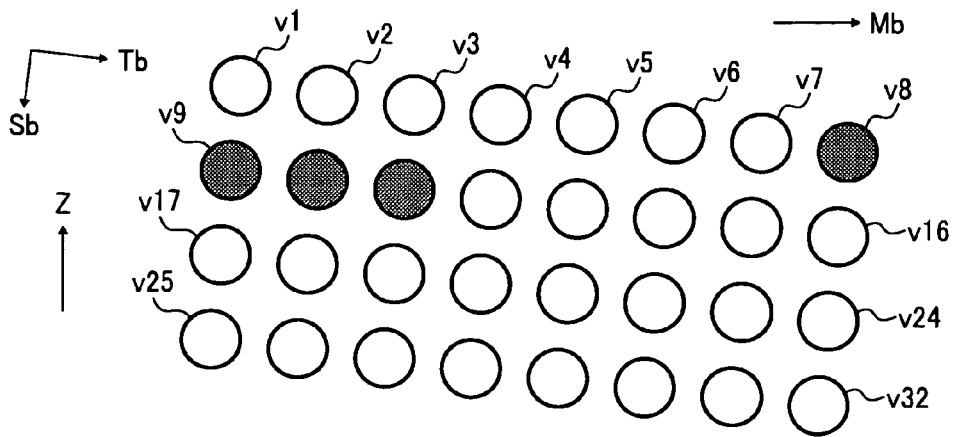

As shown in FIGS. 16A to 16C as an example, a second combination uses four light-emitting units, in which one part of the four light-emitting units and the remaining light-emitting units belong to two adjacent columns of the light-emitting units (that is, v7 to v10 in FIG. 16A, v7 to v10 in FIG. 16B, and v8 to v11 in FIG. 16C). Hereinafter the second combination is referred to as "a second pattern" for convenience. In addition, the four light-emitting units of the second pattern are collectively referred to as "a second group of the light-emitting units".

Figure 17:
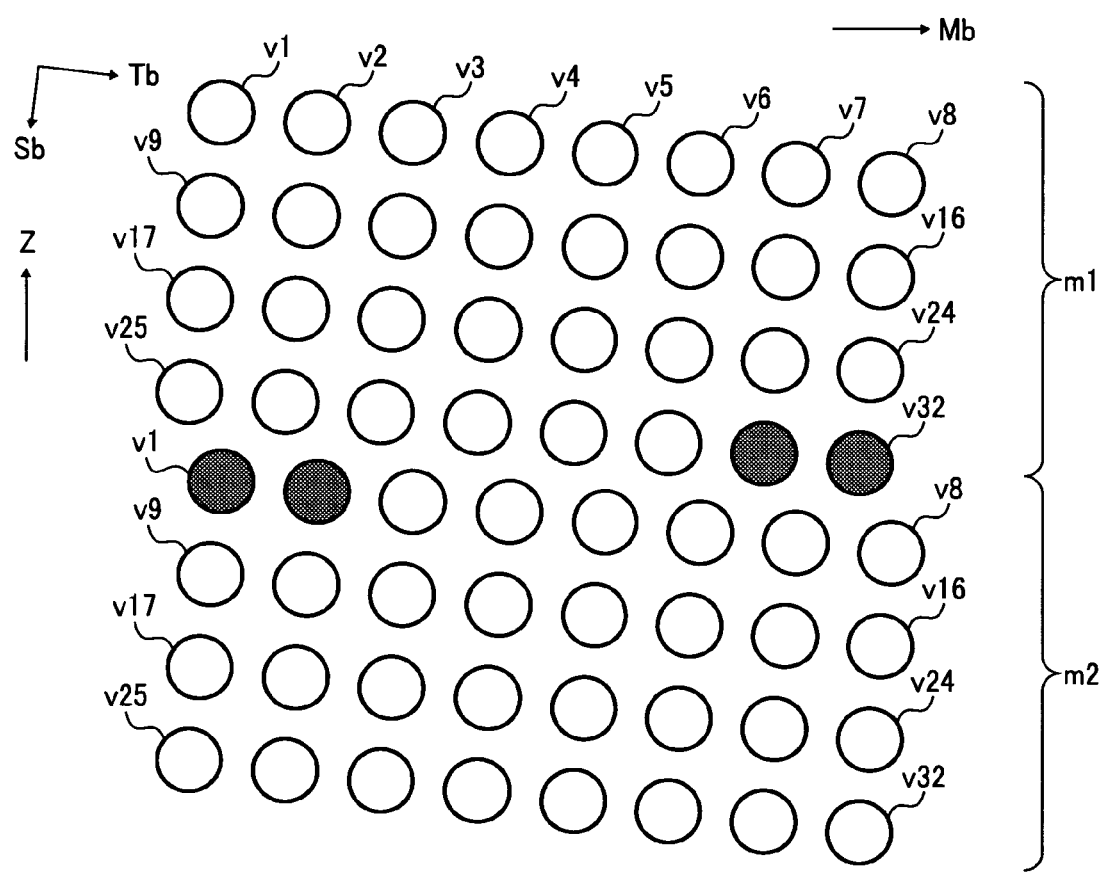
FIG. 17 is a view for illustrating a third pattern of a combination of the light-emitting units.

As shown in FIG. 17 as an example, a third combination uses four light-emitting units including light-emitting units whose emitted light beams are deflected on the other mirror surfaces of the polygon mirror 104 (that is, in FIG. 17, the light-emitting units v31 and v32 whose emitted light beams are deflected on the mirror surface m1 and the light-emitting units v1 and v2 whose emitted light beams are deflected on the mirror surface m2). Hereinafter the third combination is referred to as "a third pattern" for convenience. Note that the third pattern includes, for example, the case where the four light-emitting units are formed of the light-emitting unit v32 whose emitted light is deflected on the mirror surface m1 and the light-emitting units v1 to v3 whose emitted light beams are deflected on the mirror surface m2 and the case where the four light-emitting units are formed of the light-emitting units v30 to v32 whose emitted light beams are deflected on the mirror surface m1 and the light-emitting unit v1 whose emitted light is deflected on the mirror surface m2. In addition, the four light-emitting units of the third pattern are collectively referred to as "a third group of the light-emitting units".

And now, an inclination angle γ in the laser array is generally determined so that a scanning pitch between adjacent spot images in the sub-scanning direction would be a predetermined value by using the beam spot columns arranged in the main scanning direction as a reference. Thus, a pitch between rows arranged in the sub-scanning direction is uniquely determined. In this case, displacement of lateral magnification of the entire optical system from the light-emitting units to the photosensitive drums may vary in the main scanning direction and the sub-scanning direction, or a scanning pitch error between the mirror surfaces due to the face tangle error of the polygon mirror may remain because of process errors of the scanning lenses, such as fθ lenses and the toroidal lenses.

Figure 18:
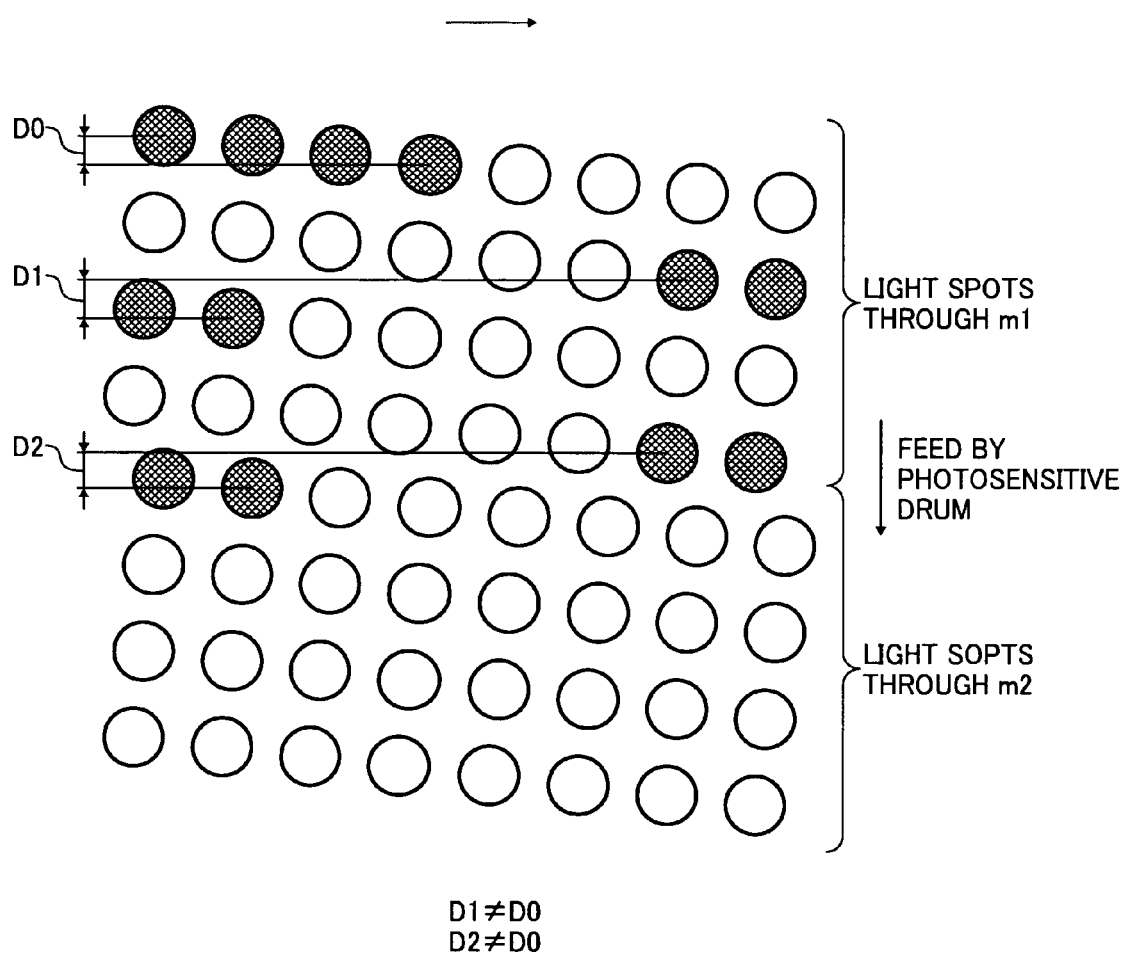
FIG. 18 is a view for illustrating displacement of light spots in the sub-scanning direction due to a positional relationship between the light-emitting units in a group of the light-emitting units.

At this time, as shown in FIG. 18 as an example, the distance D1 in the sub-scanning direction of the light spots on both sides of the sub-scanning direction of the four light spots formed on the photosensitive drum by the second group of the light-emitting units does not agree with the distance D0 in the sub-scanning direction of the light spots on both sides of the sub-scanning direction of the four light spots formed on the photosensitive drum by the first group of the light-emitting units. In addition, the distance D2 in the sub-scanning direction of the light spots on both sides of the sub-scanning direction of the four light spots formed on the photosensitive drum by the third group of the light-emitting units does not agree with the distance D0.

Figure 19A:
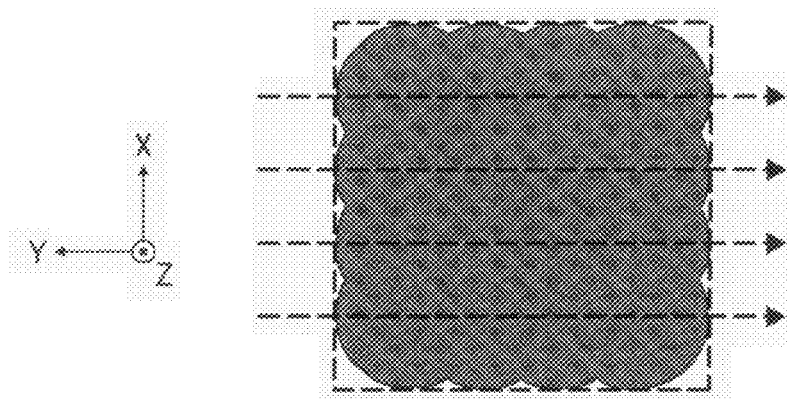
FIGS. 19A to 19C are views, each of which illustrates deformation of a pixel.
Figure 19B:
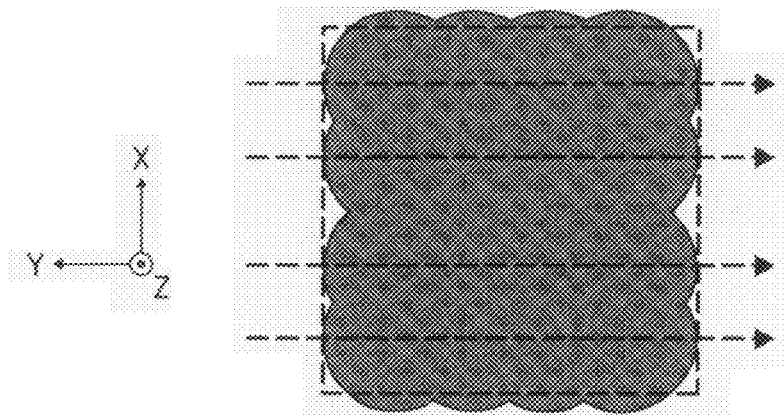
Figure 19C:
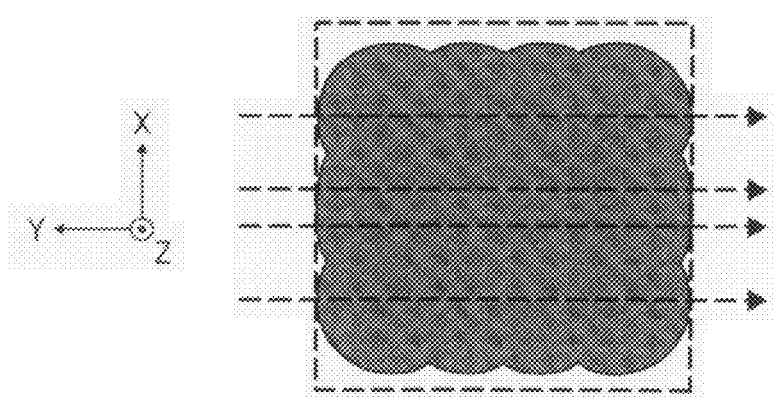

For this reason, when the combinations of the light-emitting units correspond to the second and third patterns, one pixel may be larger in the sub-scanning direction than that intended as shown in FIG. 19 as an example, or may be smaller in the sub-scanning direction than that intended as shown in FIG. 19C as an example, in length or width. That is, the shape of the pixel may be deformed. Note that in the following description, for convenience, the pixel longer in the sub-scanning direction than that intended is referred to as "type one of the deformation pixel" and the pixel shorter in the sub-scanning direction than that intended is referred to as "type two of the deformation pixel". For simplicity, FIGS. 19A to 19C are exaggeratingly shown.

Figure 20:
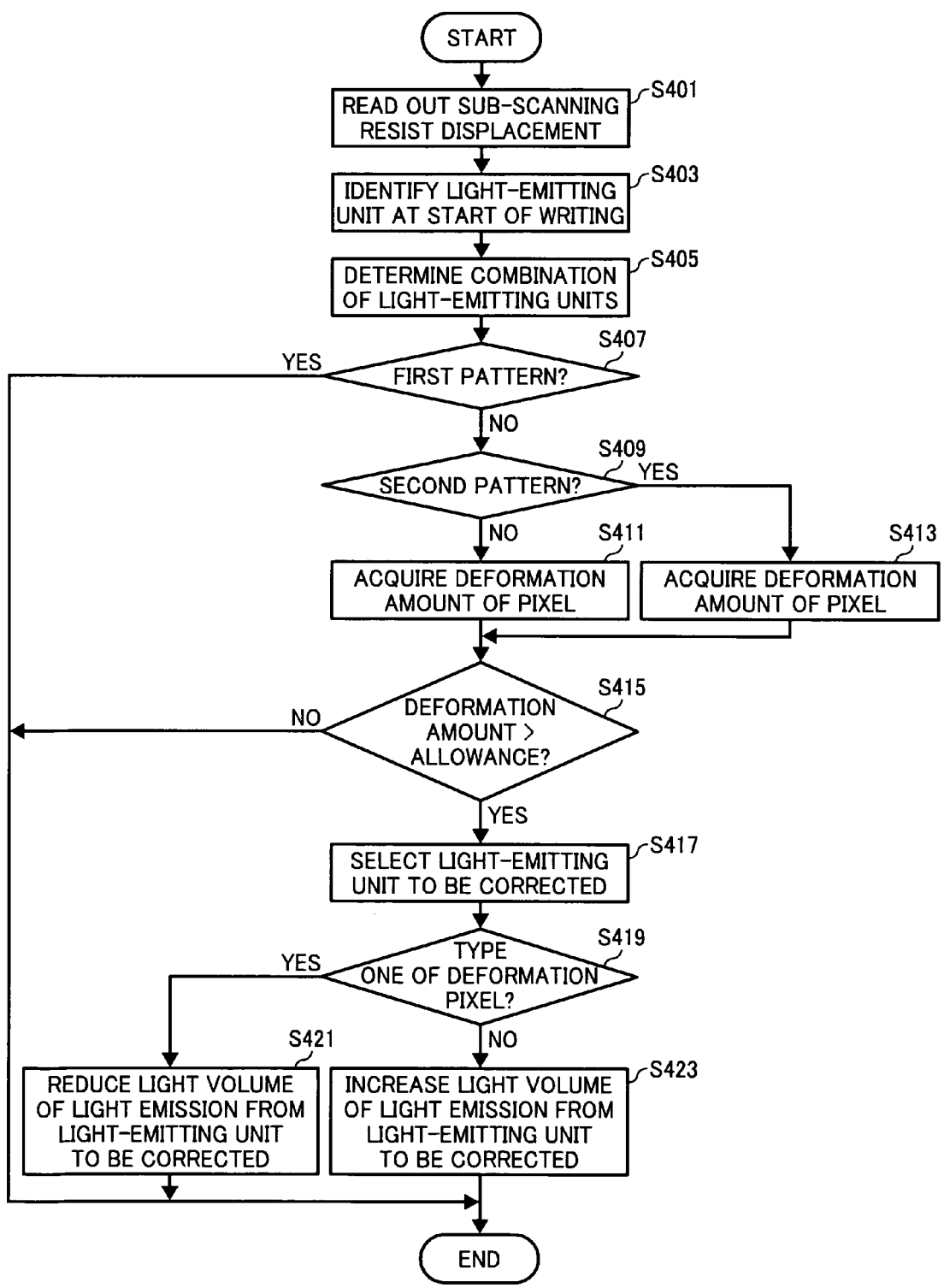
FIG. 20 is a flowchart for illustrating an adjusting process of light volume.

The CPU 211 performs processing in the flowchart shown in FIG. 20 to control the deformation of pixel. The flowchart in FIG. 20 corresponds to a set of processing algorithms executed by the CPU 211. Here, the case where the photosensitive drum 30c is scanned is described as an example. For example, when acquisition of the sub-scanning resist displacement in the photosensitive drum 30c is completed, the starting address of a program corresponding to the flowchart of FIG. 20, which is stored in the flash memory 217, is set in the program counter of the CPU 211. Thereby, processing (hereinafter referred to as "a light volume adjustment process") is started.

Note that whether the pixel formed in the case of the second pattern is the type one or type two of the deformation pixel and the amount of deformation can be found in advance by a test. Similarly, whether the pixel formed is the case of the third pattern is the type one or type two of the deformation pixel and the amount of deformation can be found in advance by a test. Thereafter, these data art stored in the flash memory 217 (or the RAM 218) for each of the stations. In addition, the various pieces of obtained displacement information are also stored in the flash memory 217 (or the RAM 218).

At the first step S401, the sub-scanning resist displacement in the M station stored in the flash memory 217 (or the RAM 218) is read out.

At the following step S403, the light-emitting unit at the start of writing is identified on the basis of the sub-scanning resist displacement in the M station.

At step S405, four light-emitting units, which form one pixel, are selected on the basis of the light-emitting unit at the start of writing. That is, the combination of the light-emitting units is determined. The four light-emitting units selected here will be collectively referred to as "a group of the selected light-emitting units" below.

At step S407, it is determined whether or not the combination of the light-emitting units is the first pattern. If the combination of the light-emitting units is not the first pattern, the determination made here is denied. Then, the step proceeds to step S409.

At step S409, it is determined whether or not the combination of the light-emitting units is the second pattern. If the combination of the light-emitting units is not the second pattern, the determination made here is denied. Then, the step moves to step S411.

At step S411, the deformation amount of pixel on the photosensitive dram 30c in the case where the combination of the light-emitting units is the third pattern is read out from the flash memory 217 (or the RAM 218).

At step S415, allowance, which is preset and stored in the flash memory 217 (or the RAM 218), is read out to determine whether or not the deformation amount of pixel exceeds the allowance. If the deformation amount of pixel exceeds the allowance, the determination made here is affirmed. Then, the step proceeds to step S417.

At step S417, the light-emitting unit being an object to be corrected, whose light volume of light emission is corrected, is selected from the group of the selected light-emitting units. Here, as an example, two light-emitting units disposed on the both sides in the sub-scanning direction are selected as the light-emitting units to be corrected. For example, if the group of the selected light-emitting units is formed of the light-emitting units v31, v32, v1, and v2 (see, FIG. 17), the light-emitting units v31 and v2 are selected.

At step S419, it is determined whether or not a predicted pixel is the type one of deformation pixel. If the predicted pixel is the type one of deformation pixel, the determination made here is affirmed. Then, the step proceeds to S421.

Figure 21A:
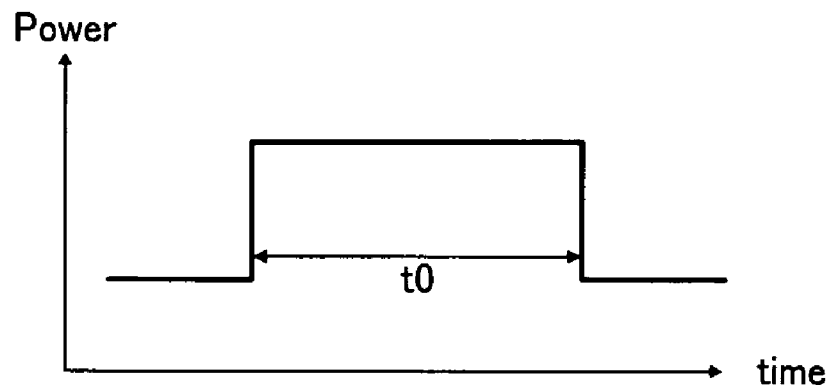
FIGS. 21A to 21C are views, each of which illustrates adjustments of a light-emitting pulse width.
Figure 21B:
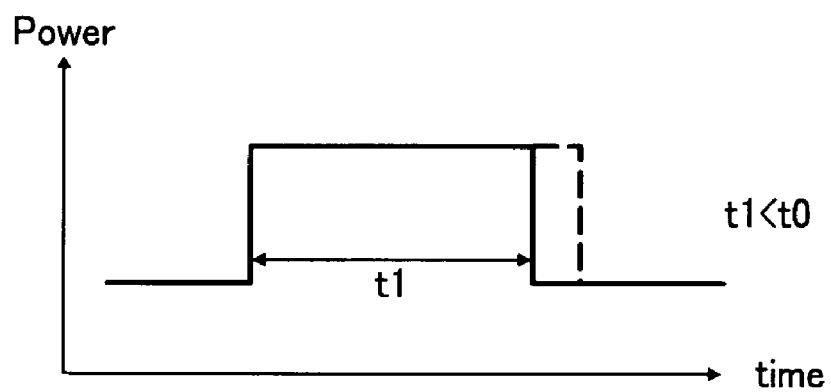
Figure 22A:
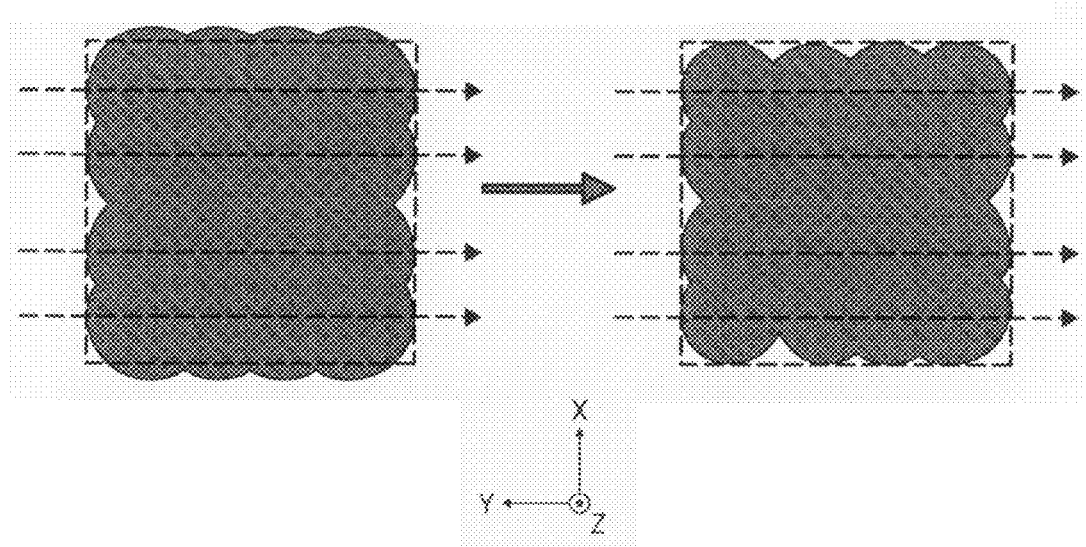
FIGS. 22A and 22B are views, each of which illustrates an effect of the adjusting process of light volume.

At step S421, the light volume of light emission from the light-emitting units to be corrected is reduced based on the deformation amount of pixel. Specifically, as shown in FIG. 21B as an example, light volume adjustment data is created so that a light-emitting pulse width of the light-emitting units to be corrected would be smaller than a conventional light emitting pulse width (see, FIG. 21A) according to the amount of the deformation of pixel. This light volume adjusting at data is outputted to the light source driving circuit 413 of the light source unit 200b. Thereby, the light volume of light emission from the light-emitting units to be corrected is decreased. As a result, the total light volume of light emission from the group of the selected light-emitting units is decreased, so that the deformation of pixel can be reduced as shown in FIG. 22A as an example. Note that a relationship between the amount of deformation pixel and the amount of reduction (or a reduction ratio) of the light-emitting pulse width is acquired in advance and stored in the flash memory 217 (or the RAM 218). Thereafter, the light volume adjustment process is finished.

Note that if the pixel is not the type one of deformation pixel at the above-described step S419, the determination made at step S419 is denied. Then, the step proceeds to the step S423.

Figure 21C:
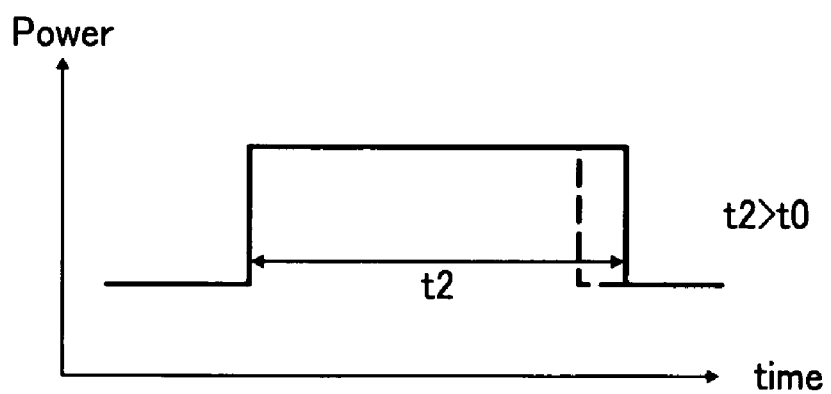
Figure 22B:
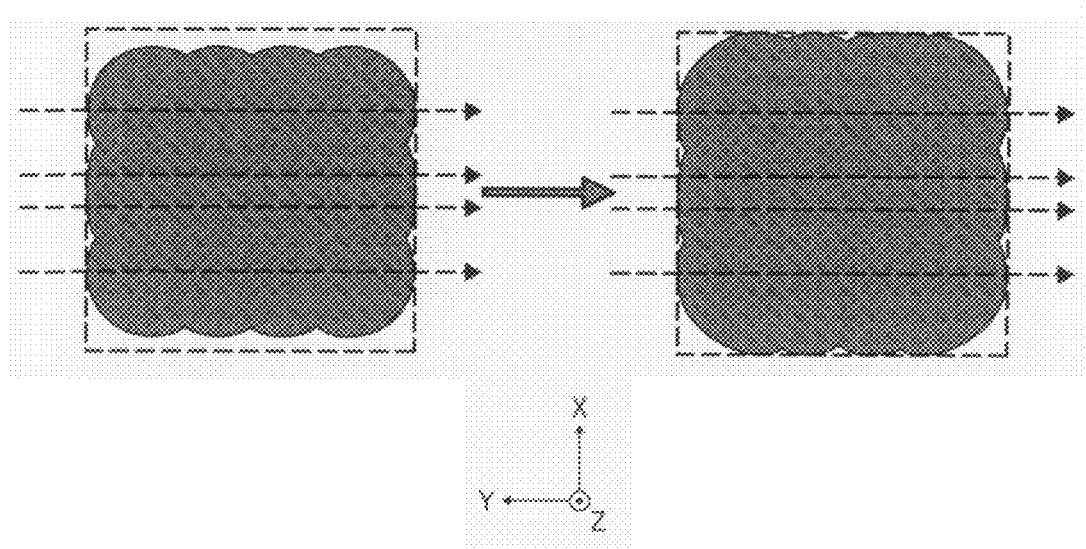

At step S423, the light volume of light emission from the light-emitting units to be corrected is increased according to the amount deformation of pixel. Specifically, as shown in FIG. 21C as an example, light volume adjustment date is created so that the light-emitting pulse width of the light-emitting units to be corrected would be larger than the conventional light emitting pulse width according to the amount deformation of pixel. This light volume adjustment data is outputted to the light source driving circuit 413 of the light source unit 200b. Thereby, the light volume of light emission from the light-emitting units to be corrected is increased. As a result, the total light volume of light emission from the group of the selected light-emitting units is increased, so that the deformation of pixel can be reduced as shown in FIG. 22B as an example. Note that a relationship between the amount of deformation of pixel and the amount of enlarged (or a magnification) of the light-emitting pulse width is acquired in advance and stored in the flash memory 217 (or the RAM 218). Thereafter, the light volume adjustment process is finished.

Note that in FIGS. 22A and 22B, the light-emitting timing is also adjusted according to the light volume of the light-emitting units to be corrected.

In addition, if the deformation amount of pixel does not exceed the allowance at the above-described step S415, the determination made at step S415 is affirmed. Then, the light volume adjustment process is finished.

If the combination of the light-emitting units is the second pattern at the above-described step S409, the determination made at step S409 is affirmed. Then, the step proceeds to step S413.

At step S413, the deformation amount of pixel on the photosensitive drum 30c in the case where the combination of the light-emitting units is the second pattern is read out from the flash memory 217 (or the RAM 218). Thereafter, the step proceeds to the step S415.

If the determination made at step S415 is affirmed in this case, for example, if the group of the selected light-emitting units is formed of the light-emitting units v7 to v10 (see, FIG. 16A), the light-emitting units v7 and v10 are selected at step S417.

If the combination of the light-emitting units is the first pattern at the above-described step S407, the determination made at step S407 is affirmed. Then, the light volume adjustment process is finished.

Note that at the above-described step S417, the two light-emitting units disposed on both sides in the main scanning direction may be selected as the light-emitting units to be corrected.

Also, at the above-described step S421, as shown in FIG. 23B as an example, light volume adjustment data may be created so that light-emitting power of the light-emitting units to be corrected would be smaller than conventional light-emitting power (see, FIG. 23A) based on the deformation amount of pixel. In this case, a relationship between the amount of deformation of pixel and the amount of reduction (or a reduction ratio) of the light-emitting power is acquired in advance and stored in the flash memory 217 (or the RAM 218).

Similarly, at the above-described step S423, as shown in FIG. 23C as an example, light volume adjustment data may be created so that light-emitting power of the light-emitting units to be corrected would be larger than conventional light-emitting power according to the amount of deformation of pixel. In this case, a relationship between the deformation amount of pixel and the increased amount (or an increased ratio) of the light-emitting power is acquired in advance and stored in the flash memory 217 (or the RAM 218).

The CPU 211 similarly performs the light volume adjustment processes in the case where another photosensitive drum is scanned. Note that all of the light volume adjustment data in the case where the photosensitive drums 30a and 30b are scanned are outputted to the light source driving circuit 413 of the light source unit 200a. In addition, the light volume adjustment data in the case where the photosensitive drum 30d is scanned is outputted to the light source driving circuit 413 of the light source unit 200b.

Return to FIG. 14. The interface (IF) 216 controls interactive communications with the upper-level device. The CPU 211 raster-develops multicolor image information from the upper-level device. Then, at predetermined timing, the CPU 211 alternately outputs black and cyan raster data to the light source unit 200a and alternately outputs magenta and yellow raster data to the light source unit 200b.

To correct the sub-scanning resist displacement with less than one line pitch, the liquid crystal device driving circuit 215 applies a voltage corresponding to the sub-scanning resist displacement in the C station to the liquid crystal deflector 203b, a voltage corresponding to the sub-scanning resist displacement in the M station to the liquid crystal deflector 203c, and a voltage corresponding to the sub-scanning resist displacement in the Y station to the liquid crystal deflector 203d. Thereby, the sub-scanning resist displacement with less than one line pitch is corrected.

To correct the inclination displacement, the motor driving circuit 219 outputs a driving signal corresponding to the inclination displacement in the C station to the stepping meter 109b, a driving signal corresponding to the inclination displacement in the M station to the stepping motor 109c, a driving signal corresponding to the inclination displacement in the Y station to the stepping motor 109d. Thereby, scanning lines between the stations become parallel with one another.

Figure 24:
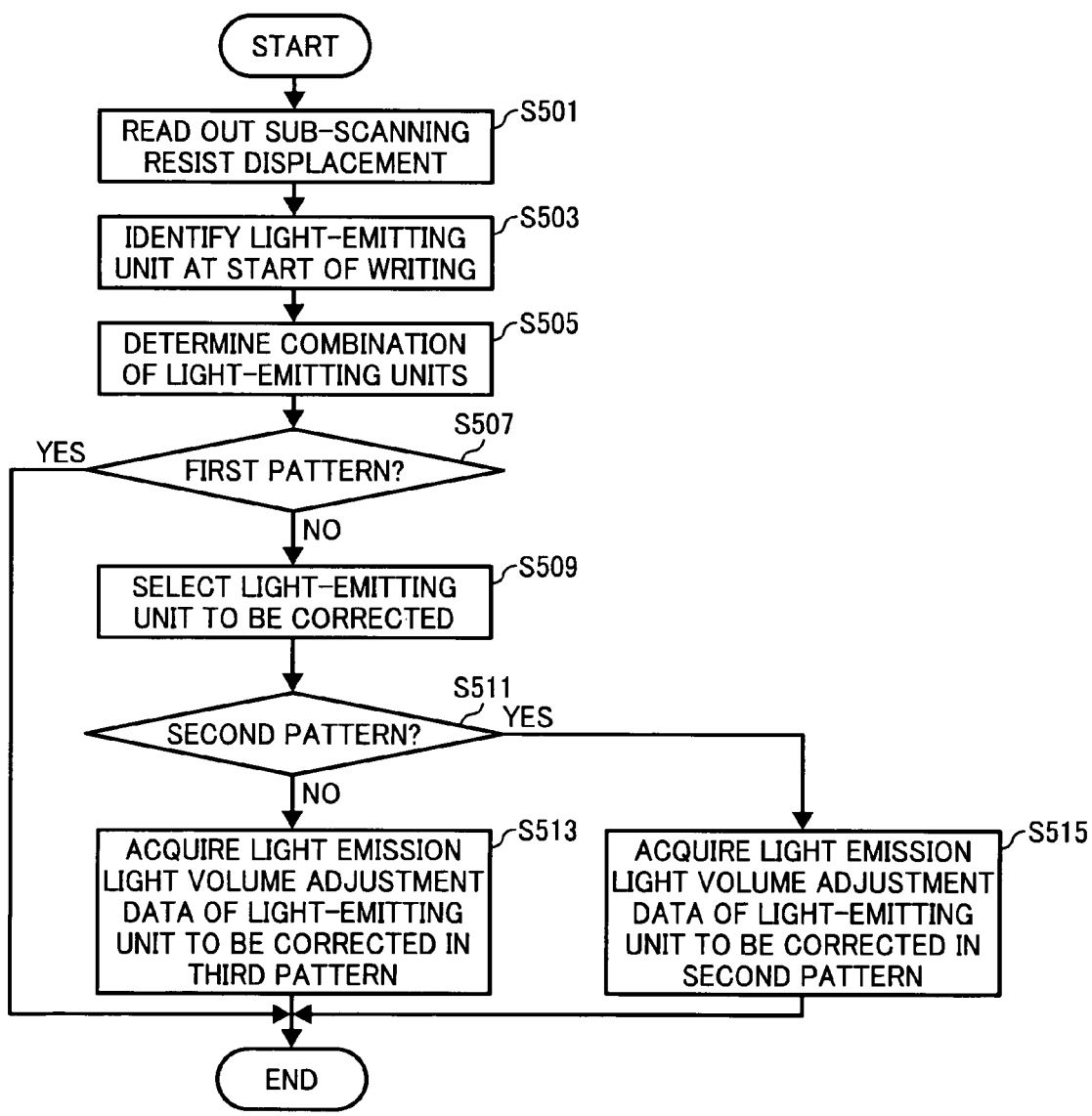
FIG. 24 is a flowchart for illustrating a modified example of an adjusting process of light volume.

Note that if the relationship between the combination of the light-emitting units and the light volume adjustment data of the light-emitting units to be corrected has been acquired in advance and stored in the flash memory 217 (or the RAM 218), the flowchart shown in FIG. 24 may be performed in place of the flowchart in FIG. 20. Thereby, the time required for the processing can be shortened.

At steps S501 to S507, processes similar to those at the steps S401 to S407 are performed.

When the determination made at step S507 is denied, the step proceeds to step S509. Then, a process similar to that at the stop S417 is performed.

At step S511, a process similar to that at the step S409 is performed. When the determination made at step S511 is denied, the step proceeds to step S513. Then, the light volume adjustment data of the light-emitting units to be corrected in the third pattern is read out from the flash memory 217 (or the RAM 218). This becomes the light volume adjustment data.

In contrast, when the determination made at step S511 is affirmed, the step proceeds to the step S515. Then, the light volume adjustment data of the light-emitting units to be corrected in the second pattern is read out from the flash memory 217 (or the RAM 218). This becomes the light volume adjustment data.

As is clear from the foregoing description, in the present embodiment, the optical scanning method according to the present invention is implemented in the light volume adjustment process.

In addition, the program according to the present invention is executed in the light volume adjustment process.

As described above, the optical scanning device according to the present embodiment predicts the amount of deformation of pixel according to the combination of the light-emitting units and then adjusts the light volume of light emission from the light-emitting units to be corrected according to the amount of deformation of pixel. Thereby, a pixel with an excellent shape quality can be constantly formed regardless of the combination of the light-emitting units. Accordingly, a pixel formed of multiple dots can be accurately and stably formed.

In addition, the printer 10 according to the present embodiment includes the optical scanning device 100 in which a pixel formed of multiple dots can be accurately and stably formed. Thus, a quality image can be formed at higher speed.

Note that in the foregoing embodiment, the case where one pixel is formed of 4×4 dote has been described. However, the present invention is not limited to this. For example, one pixel may be formed of 3×3 dots or 5×5 dots.

Also, in the foregoing embodiment, the case where each of the laser arrays has 32 light-emitting units has been described. However, the present invention is not limited to this as long as multiple light-emitting units are two-dimensionally arranged therein. In this regard, however, it is preferable that the multiple light-emitting units be arranged in the form of matrix with M rows (M≧2) and N columns (N>M) and a row direction of the M rows be inclined from a direction corresponding to the main scanning direction toward a direction corresponding to the sub-scanning direction.

Also, in the foregoing embodiment, the case where the amount of light emission from the two light-emitting units out of four light-emitting units is adjusted has been described. However, the present invention is not limited to this. For example, the light volume of light emission from all of the light-emitting units may be adjusted.

Also, in the foregoing embodiment, the case where the intervals between the light-emitting units in the Tb direction and the light-emitting units in the Sb direction are same has been described. However, the present invention is not limited to this. For example, the intervals between the light-emitting units in the Tb direction and the light-emitting units in the Tb direction may be different.

Also, in the foregoing embodiment, the Sb direction may agree with the Z-axis direction.

Also, in the foregoing embodiment, a light source unit may be provided for each color. That is, four light source units may be provided.

Also, in the foregoing embodiment, the control substrate 150b and the photoreceptor 157b may be integrated.

Also, in the foregoing embodiment, the program according to the present invention is recorded in the flash memory 217. However, it may be recorded in another recording medium (such as a CD, a magneto-optic disk, a DVD, a memory card, an USB memory, or a flexible disk). In this case, the program according to the present invention can be loaded in the flash memory 217 through a reproduction device (or a dedicated interface) corresponding to each recording medium. In addition, the program according to the present invention may be transferred to the flash memory 217 through a network (such as a LAN, an intranet, or the Internet).

In addition, at least one part or all of the processes according to the program, which are executed by the CPU 211, in the foregoing embodiment may be configured by hardware.

Also, in the foregoing embodiment, the case where the color tandem printer is used as an image forming apparatus has been described. However, the present invention is not limited to this. For example, as long as an image forming apparatus includes the optical scanning device 100, a high quality image can be formed at higher speed even in the image forming apparatus other than a printer (such as, a copier, a facsimile, or a multifunction device in which these functions are integrated).

In addition, an image forming apparatus may be one with a coloring medium which colors using thermal energy of the beam spots as an image carrier (positive photographic paper). In this case, a visible image can be directly formed on the image carrier by optical scanning.

Also, in the foregoing embodiment, the case where the multicolor printer is used as an image forming apparatus has been described. However, the present invention is not limited to this. For example, a monochrome image forming apparatus may be used to perform a light volume adjustment process similar to the above-described light volume adjustment process. Thereby, a high quality image can be formed at higher speed.

In this manner, the adjustment device adjusts the total light volume of light emission from the group of light-emitting units based on the positional relationship between the light-emitting units in the group of light-emitting units formed of at least two light-emitting units. The light-emitting units are selected from the multiple light-emitting units and form one pixel. Thus, even when the positional relationship between the light-emitting units in the group of light-emitting units is changed, the changes in size and shape of the pixel can be suppressed. Accordingly, a pixel formed of multiple dots can be accurately and stably formed.

Note that "deformation of a pixel" in this specification includes a shape change against a target image (a designed pixel) as well as a size change (an analogous change). In addition, one pixel is a basic unit of an image (including a latent image) to be formed on a surface to be scanned and an image is formed of multiple pixels. The size of image relates to a resolution of the image.

The present invention provides an optical scanning method for scanning a surface to be scanned with a plurality of light beams from a plurality of two-dimensionally arranged light-emitting units. The method includes the steps of selecting a group of light-emitting units formed of at least two light-emitting units, which form one pixel, from the plurality of light-emitting units; and adjusting a total light volume of light emitting from the group of light-emitting units on the basis of a positional relationship between the light-emitting units in the group of light-emitting units.

In the method, the group of light-emitting units formed of at least two light-emitting units, which form one pixel, is selected from a plurality of light-emitting units and adjusts a total light volume of light emission from the group of light-emitting units on the basis of a positional relationship between the light-emitting units in the group of light-emitting units. Thus, even when the positional relationship between the light-emitting units in the group of light-emitting units is changed, the changes in size and shape of the pixel can be suppressed. Accordingly, a pixel formed of multiple dots can be accurately and stably formed.

The present invention provides a program wed in an optical scanning device, which has a plurality of two-dimensionally arranged light-emitting units and scans a surface to be scanned with a plurality of light beams. The program causes a control computer of the optical scanning device to execute the steps of selecting a group of light-emitting units formed of at least two light-emitting units, which form one pixel, from the plurality of light-emitting units and adjusting a total light volume of light emitting from the group of light-emitting units on the basis of a positional relationship between the light-emitting units in the group of light-emitting units.

According to the program, a program according to the present invention is loaded in a memory. When the starting address of the program is set in the program counter, the control computer of the optical scanning device selects a group of light-emitting units formed of at least two light-emitting units, which form one pixel, from the plurality of light-emitting units and adjusts a total light volume of light emission from the group of light-emitting units based on a positional relationship between the light-emitting units in the group of light-emitting units. That is, the program according to the present invention causes the control computer of the optical scanning device to execute the optical scanning method according to the present invention. Accordingly, a pixel formed of multiple dots can be accurately and stably formed.

Furthermore, the present invention provides a computer readable recording medium in which the program according to the present invention is recorded.

According to the recording medium, a pixel formed of multiple dots can be accurately and stably formed by causing the computer to execute the program according to the present invention because the program is recorded in the recording medium.

Moreover, the present invention provides an image forming apparatus including at least one image carrier and at least one optical scanning device according to the present invention for scanning the at least one image carrier with multiple light beams including image information.

The image forming apparatus can form a quality image at higher speed because it includes at least one optical scanning device according to the present invention.

Although the present invention ha been described in terms of exemplary embodiments, it is not limited thereto. It should be appreciated that variations may be made in the embodiments described by persons skilled in the art without departing from the scope of the present invention as defined by the following claims.

What is claimed is:

1. An optical scanning device for scanning a surface to be scanned with a plurality of light beams, comprising:
    at least one light source in which a plurality of light-emitting units are two-dimensionally arranged;
    a deflector for deflecting a plurality of light beams from the at least one light source;
    an optical system for condensing the plurality of light beams deflected by the deflector on the surface to be scanned; and
    an adjustment device for adjusting a total light volume of light emission from the plurality of light-emitting units; and
    a control device to control the optical scanning device, wherein the control device is configured to read out a resist of the scanned surface in a sub-scanning direction, identify a light-emitting unit at a start of writing from the light-emitting based on the resist in the sub-scanning direction, select a plurality of light-emitting units forming one pixel based on the light-emitting unit at the start of writing, and read out a deformation amount of pixel in the scanned surface by the selected light-emitting units, and wherein the control device is configured to control the adjustment device so that the adjustment device adjusts a total light volume of light emission of the selected light-emitting units based on the deformation amount of the pixel.

2. The optical scanning device according to claim 1, wherein the adjustment device adjusts the total light volume of light emission to reduce deformation of the pixel predicted from the positional relationship in the sub-scanning direction.

3. The optical scanning device according to claim 2, wherein the adjustment device reduces the total light volume of light emission according to the amount of displacement from a designed value, when the width of the pixel is predicted to be bigger than the designed value in the sub-scanning direction.

4. The optical scanning device according to claim 2, wherein the adjustment device increases the total light volume of light emission according to the amount of displacement from a designed value, when the width of the pixel is predicted to be smaller than the designed value in the sub-scanning direction.

5. The optical scanning device according to claim 1, wherein the adjustment device adjusts a light volume of light emission from at least one light-emitting unit including a specific light-emitting unit in the group of the light-emitting units.

6. The optical scanning device according to claim 5, wherein the specific light-emitting unit is a light-emitting unit which is positioned in an end portion in the group of the light-emitting units in the direction corresponding to the main scanning direction.

7. The optical scanning device according to claim 5, wherein the specific light-emitting unit is a light-emitting unit which is positioned in an end portion in the group of the light-emitting units in the direction corresponding to the sub-scanning direction.

8. The optical scanning device according to claim 5, wherein the adjustment device adjusts at least one of a light-emitting time and light-emitting power of the specific light-emitting unit.

9. The optical scanning device according to claim 1, wherein the plurality of light-emitting units are arranged in the form of matrix with M rows (M≧2) and N columns (N>M), and the row direction of the M rows is inclined from the direction corresponding to the main scanning direction toward the direction corresponding to the sub-scanning direction.

10. The optical scanning device according to claim 9, wherein the N columns include adjacent first and second columns to each other, and at least one light-emitting unit in one portion in the group of the light emitting units belongs to the first column and the remaining light-emitting units in the group of the light-emitting units belong to the second column.

11. The optical scanning device according to claim 1, wherein the deflector has first and second deflection surfaces, and light from at least one light-emitting unit in one portion in the group of the light-emitting units is deflected by the first deflection surface and the light beams from the remaining light-emitting units in the group of the light-emitting units are deflected by the second deflection surface.

12. An optical scanning method for scanning a surface to be scanned with a plurality of light beams from a plurality of two-dimensionally arranged light-emitting units, comprising the steps of:
reading out a resist of the scanned surface in a sub-scanning directing;
identifying a light-emitting unit at a start of writing from the light-emitting units based on the resist in the sub-scanning direction;
selecting a plurality of light-emitting units forming one pixel based on the light-emitting unit at the start of writing;
reading out a deformation amount of pixel in the scanned surface by the selected light-emitting units; and
adjusting total light volume of light emission of the selected light-emitting units based on the deformation amount of pixel.

13. The optical scanning method according to claim 12, wherein, in the adjusting step, the total light volume of light emission is adjusted to reduce deformation of the pixel predicted from the positional relationship in the sub-scanning direction.

14. The optical scanning method according to claim 12, wherein, in the adjusting step, the total volume of light emission is adjusted according to the amount of displacement from a designed value, when the width of the pixel is predicted to be bigger than the designed value in the sub-scanning direction.

15. A non-transitory storage medium storing a program used in an optical scanning device which has a plurality of two-dimensionally arranged light-emitting units, and which scans a surface to be scanned with a plurality of light beams, the program causing a control computer of the optical scanning device to execute the steps of:
reading out a resist of the scanned surface in a sub-scanning directing;
identifying a light-emitting unit at a start of writing from the light-emitting units based on the resist in the sub-scanning direction;
selecting a plurality of light-emitting units forming one pixel based on the light-emitting unit at the start of writing;
reading out a deformation amount of pixel in the scanned surface by the selected light-emitting units; and
adjusting a total light volume of light emission of the selected light-emitting units based on the deformation amount of pixel.

16. The medium according to claim 15, the program causing the control computer to execute the step of adjusting the total light volume of light emission, as the adjusting step, to reduce deformation of the pixel predicted from the positional relationship in the sub-scanning direction.

17. The medium, according to claim 16, the program causing the control computer to execute the step of reducing the total volume of light emission, as the adjusting step, according to the amount of displacement from a designed value, when the width of the pixel is predicted to be bigger than the designed value in the sub-scanning direction.

18. An image forming apparatus, comprising: at least one image carrier; and the optical scanning device according to claim 1, which scans the at least one image carrier with a plurality of light beams including image information.

19. The image forming apparatus according to claim 18, wherein the image information is multicolor image information.

* * * * *